United States Patent
Tsuru et al.

(10) Patent No.: US 11,831,993 B2
(45) Date of Patent: Nov. 28, 2023

(54) INFORMATION PROCESSING APPARATUS, INFORMATION PROCESSING SYSTEM, DEVICE FOR POSITION AND POSTURE ACQUISITION, AND DEVICE INFORMATION ACQUISITION METHOD

(71) Applicants: Sony Interactive Entertainment Inc., Tokyo (JP); Sony Interactive Entertainment Europe Ltd., London (GB)

(72) Inventors: Daisuke Tsuru, Tokyo (JP); Kenzo Nishikawa, Tokyo (JP); Winesh Sharwin Raghoebardajal, Amstelveen (NL)

(73) Assignees: Sony Interactive Entertainment Inc., Tokyo (JP); Sony Interactive Entertainment Europe LTD., London (GB)

( * ) Notice: Subject to any disclaimer, the term of this patent is extended or adjusted under 35 U.S.C. 154(b) by 359 days.

(21) Appl. No.: 17/297,157

(22) PCT Filed: Nov. 22, 2019

(86) PCT No.: PCT/JP2019/045751
§ 371 (c)(1),
(2) Date: May 26, 2021

(87) PCT Pub. No.: WO2020/110929
PCT Pub. Date: Jun. 4, 2020

(65) Prior Publication Data
US 2022/0021798 A1   Jan. 20, 2022

(30) Foreign Application Priority Data
Nov. 30, 2018 (JP) .................................. 2018-225747

(51) Int. Cl.
*H04N 23/73* (2023.01)
*G06T 7/70* (2017.01)
*H04N 23/56* (2023.01)

(52) U.S. Cl.
CPC ............... *H04N 23/73* (2023.01); *G06T 7/70* (2017.01); *H04N 23/56* (2023.01)

(58) Field of Classification Search
CPC .......... H04N 23/73; H04N 23/56; G06T 7/70; G06T 2207/10016; G06T 2207/30204;
(Continued)

(56) References Cited

U.S. PATENT DOCUMENTS 8,350,805 B2   1/2013   Miyazaki
9,354,717 B2   5/2016   Huang
(Continued)

FOREIGN PATENT DOCUMENTS

CN   1856121 A   11/2006
CN   103257722 A   8/2013
(Continued)

OTHER PUBLICATIONS

Kreho et al., "Design of Active Visual Marker for High Speed Object Tracking by Frame Subsampling," 2019 XXVII International Conference on Information, Communication and Automation Technologies (ICAT), Sarajevo, Bosnia and Herzegovina, 2019, pp. 1-6, doi: 10.1109/ICAT47117.2019. (Year: 2019).*

(Continued)

*Primary Examiner* — Timothy J Henn
(74) *Attorney, Agent, or Firm* — Matthew B. Dernier, Esq.

(57) ABSTRACT

An information processing apparatus acquires, using an image obtained by capturing a device including a light-emitting marker with exposure times shorter than a time corresponding to one frame, information regarding a posi-
(Continued)

tion and a posture of the device. The light-emitting marker is caused to emit light for light emission times equal to or shorter than the exposure times. The information processing apparatus causes the light-emitting marker to emit light in a predetermined flashing pattern, and identifies the exposure times on a time axis of the device on the basis of whether or not the image appears in the captured image, to thereby synchronize the exposure and the light emission.

17 Claims, 10 Drawing Sheets

(58) Field of Classification Search
CPC . G06T 7/248; G06T 7/277; G06T 7/74; A63F 13/211; A63F 13/212; A63F 13/213; G06F 3/014; G06F 3/0304; G06F 3/0346; G06F 3/011; G01B 11/002
See application file for complete search history.

(56) References Cited

U.S. PATENT DOCUMENTS

| | | | |
|---|---|---|---|
| 9,978,000 B2 | 5/2018 | Uchida | |
| 10,313,599 B2 | 6/2019 | Fuchikami | |
| 10,574,906 B2 | 2/2020 | Horikawa | |
| 10,740,924 B2* | 8/2020 | Balan | A63F 13/211 |
| 2005/0105772 A1* | 5/2005 | Voronka | G06V 40/20 |
| | | | 382/103 |
| 2009/0174657 A1 | 7/2009 | Miyazaki | |
| 2013/0215257 A1 | 8/2013 | Huang | |
| 2015/0222798 A1 | 8/2015 | Fuchikami | |
| 2016/0227203 A1* | 8/2016 | Inada | H04N 13/366 |
| 2017/0154247 A1 | 6/2017 | Uchida | |
| 2018/0329484 A1 | 11/2018 | Steedly | |
| 2018/0330521 A1 | 11/2018 | Samples | |
| 2018/0373332 A1* | 12/2018 | Keller | G06F 3/147 |
| 2019/0222773 A1 | 7/2019 | Horikawa | |
| 2020/0342621 A1* | 10/2020 | Nishikawa | G06V 40/28 |
| 2020/0342624 A1* | 10/2020 | Nishikawa | G06T 7/66 |
| 2022/0143495 A1* | 5/2022 | Nishikawa | A63F 13/428 |

FOREIGN PATENT DOCUMENTS

| | | |
|---|---|---|
| CN | 104603574 A | 5/2015 |
| CN | 107637067 A | 1/2018 |
| EP | 0999518 A1 | 5/2000 |
| EP | 3954443 A1 | 2/2022 |
| JP | 2000259340 A | 9/2000 |
| JP | 2002202317 A | 7/2002 |
| JP | 2005003445 A * | 1/2005 |
| JP | 2006033329 A | 2/2006 |
| JP | 2007275474 A | 10/2007 |
| JP | 2017101960 A | 6/2017 |

OTHER PUBLICATIONS

Extended European Search Report for corresponding EP Application No. 19890166.2, 9 pages, dated Aug. 3, 2022.
Decision to Grant a Patent for corresponding JP Application No. 2018-225747, 4 pages, dated Nov. 22, 2022.
Office Action for corresponding CN Application No. 201980078637. 3, 16 pages, dated Jul. 13, 2022.
International Preliminary Report on Patentability and Written Opinion for corresponding PCT Application PCT/JP2019/045751, 12 pages, dated Jun. 10, 2021.
International Search Report for corresponding PCT Application PCT/JP2019/045751, 4 pages, dated Feb. 18, 2020.

* cited by examiner

|  | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| position0 | 1 | 1 | 1 | 1 | 1 | 1 | 1 | 1 | 1 | 1 | 0 | 0 | 0 | 0 | 0 | 0 | 0 | 0 | 0 | 0 |
| position1 | 1 | 1 | 1 | 1 | 1 | 1 | 1 | 1 | 1 | 1 | 0 | 0 | 0 | 0 | 0 | 0 | 0 | 0 | 0 | 1 |
| position2 | 1 | 1 | 1 | 1 | 1 | 1 | 1 | 1 | 1 | 0 | 0 | 0 | 0 | 0 | 0 | 0 | 0 | 0 | 0 | 1 |
| position3 | 1 | 1 | 1 | 1 | 1 | 1 | 1 | 1 | 1 | 0 | 0 | 0 | 0 | 0 | 0 | 0 | 0 | 0 | 1 | 1 |
| position4 | 1 | 1 | 1 | 1 | 1 | 1 | 1 | 1 | 0 | 0 | 0 | 0 | 0 | 0 | 0 | 0 | 0 | 0 | 1 | 1 |
| position5 | 1 | 1 | 1 | 1 | 1 | 1 | 1 | 1 | 0 | 0 | 0 | 0 | 0 | 0 | 0 | 0 | 0 | 1 | 1 | 1 |
| position6 | 1 | 1 | 1 | 1 | 1 | 1 | 1 | 0 | 0 | 0 | 0 | 0 | 0 | 0 | 0 | 0 | 1 | 1 | 1 | 1 |
| position7 | 1 | 1 | 1 | 1 | 1 | 1 | 1 | 0 | 0 | 0 | 0 | 0 | 0 | 0 | 0 | 1 | 1 | 1 | 1 | 1 |
| position8 | 1 | 1 | 1 | 1 | 1 | 1 | 0 | 0 | 0 | 0 | 0 | 0 | 0 | 0 | 0 | 1 | 1 | 1 | 1 | 1 |
| position9 | 1 | 1 | 1 | 1 | 1 | 1 | 0 | 0 | 0 | 0 | 0 | 0 | 0 | 0 | 1 | 1 | 1 | 1 | 1 | 1 |
| position10 | 1 | 1 | 1 | 1 | 1 | 0 | 0 | 0 | 0 | 0 | 0 | 0 | 0 | 0 | 1 | 1 | 1 | 1 | 1 | 1 |
| position11 | 1 | 1 | 1 | 1 | 1 | 0 | 0 | 0 | 0 | 0 | 0 | 0 | 0 | 1 | 1 | 1 | 1 | 1 | 1 | 1 |
| position12 | 1 | 1 | 1 | 1 | 0 | 0 | 0 | 0 | 0 | 0 | 0 | 0 | 0 | 1 | 1 | 1 | 1 | 1 | 1 | 1 |
| position13 | 1 | 1 | 1 | 1 | 0 | 0 | 0 | 0 | 0 | 0 | 0 | 0 | 1 | 1 | 1 | 1 | 1 | 1 | 1 | 1 |
| position14 | 1 | 1 | 1 | 0 | 0 | 0 | 0 | 0 | 0 | 0 | 0 | 0 | 1 | 1 | 1 | 1 | 1 | 1 | 1 | 1 |
| position15 | 1 | 1 | 1 | 0 | 0 | 0 | 0 | 0 | 0 | 0 | 0 | 1 | 1 | 1 | 1 | 1 | 1 | 1 | 1 | 1 |
| position16 | 1 | 1 | 0 | 0 | 0 | 0 | 0 | 0 | 0 | 0 | 0 | 1 | 1 | 1 | 1 | 1 | 1 | 1 | 1 | 1 |
| position17 | 1 | 1 | 0 | 0 | 0 | 0 | 0 | 0 | 0 | 0 | 1 | 1 | 1 | 1 | 1 | 1 | 1 | 1 | 1 | 1 |
| position18 | 1 | 0 | 0 | 0 | 0 | 0 | 0 | 0 | 0 | 0 | 1 | 1 | 1 | 1 | 1 | 1 | 1 | 1 | 1 | 1 |
| position19 | 1 | 0 | 0 | 0 | 0 | 0 | 0 | 0 | 0 | 0 | 1 | 1 | 1 | 1 | 1 | 1 | 1 | 1 | 1 | 1 |
| position20 | 0 | 0 | 0 | 0 | 0 | 0 | 0 | 0 | 0 | 0 | 1 | 1 | 1 | 1 | 1 | 1 | 1 | 1 | 1 | 1 |

| LIGHT EMISSION TIME POINT ID | CORRECTION AMOUNT |
|---|---|
| position0 | −2.5 |
| position1 | −2 |
| position2 | −2 |
| position3 | −1.5 |
| position4 | −1.5 |
| position5 | −1 |
| position6 | −1 |
| position7 | −0.5 |
| position8 | −0.5 |
| position9 | 0 |
| position10 | 0 |
| position11 | 0 |
| position12 | 0.5 |
| position13 | 0.5 |
| position14 | 1 |
| position15 | 1 |
| position16 | 1.5 |
| position17 | 1.5 |
| position18 | 2 |
| position19 | 2 |
| position20 | 2.5 |

90

INFORMATION PROCESSING APPARATUS, INFORMATION PROCESSING SYSTEM, DEVICE FOR POSITION AND POSTURE ACQUISITION, AND DEVICE INFORMATION ACQUISITION METHOD

TECHNICAL FIELD

The present invention relates to an information processing apparatus, an information processing system, a device for position and posture acquisition, and a device information acquisition method for acquiring information regarding a position and a posture of a device by image capturing.

BACKGROUND ART

Some video games involve capturing a user's body and markers with a camera and having a region of the image replaced with another image for display on a display (for example, see PTL 1). Also known are user interface systems by which movements of the user's mouth or hands captured by a camera are interpreted as instructions to operate an application. Such a technology for capturing the real world to display a virtual world reacting to the captured movements or to perform some kind of information processing on the images has been used extensively on diverse scales ranging from mobile terminals to leisure facilities.

CITATION LIST

Patent Literature

[PTL 1] European Patent Publication No. 0999518 A1

SUMMARY

Technical Problem

The above-mentioned technology faces the important challenge of how to accurately acquire information associated with the real world from captured images. For example, when there are a large number of objects in the field of view, an object other than an object whose position and posture are to be recognized is sometimes detected as the object in question. Further, the luminance distribution of captured images largely changes depending on the brightness in the image-capturing environment or the lighting arrangement, to thereby affect the analysis accuracy in some cases. Thus, a technology that is highly robust to changes in environment or circumstance and that can acquire accurate information from captured images has been demanded.

The present invention has been made in view of such a challenge and has an object to provide a technology capable of acquiring information associated with objects at stable accuracy by using captured images.

Solution to Problem

A mode of the present invention relates to an information processing apparatus. The information processing apparatus includes a captured image acquiring section configured to acquire data on a moving image obtained by an imaging apparatus capturing a device including a light-emitting marker with an exposure time shorter than a period of one frame, a synchronous processing section configured to request the device to cause the light-emitting marker to emit light in a predetermined flashing pattern in a minimum unit being a time obtained by dividing the period of the one frame by a predetermined number and configured to identify the exposure time on a time axis of the device, based on whether or not an image of the light-emitting marker appears in a predetermined number of frames of the moving image obtained by capturing the device, a control information transmitting section configured to request the device to cause the light-emitting marker to emit light at a light emission time point corresponding to the exposure time, a position and posture acquiring section configured to acquire position and posture information regarding the device based on the image in a frame of the moving image of the light-emitting marker emitting light at the light emission time point for a fixed period of time equal to or shorter than the exposure time, and an output data generating section configured to generate and output data based on the position and posture information.

Another mode of the present invention relates to an information processing system. The information processing system includes a device including a light-emitting marker, an imaging apparatus configured to capture the device with an exposure time shorter than a period of one frame, and an information processing apparatus configured to acquire position and posture information regarding the device by using data on a moving image captured by the imaging apparatus. The information processing apparatus includes a synchronous processing section configured to request the device to cause the light-emitting marker to emit light in a predetermined flashing pattern in a minimum unit being a time obtained by dividing the period of the one frame by a predetermined number and configured to identify the exposure time on a time axis of the device, based on whether or not an image of the light-emitting marker appears in a predetermined number of frames of the moving image obtained by capturing the device, a control information transmitting section configured to request the device to cause the light-emitting marker to emit light at a light emission time point corresponding to the exposure time, a position and posture acquiring section configured to acquire the position and posture information regarding the device based on the image in a frame of the moving image of the light-emitting marker emitting light at the light emission time point for a fixed period of time equal to or shorter than the exposure time, and an output data generating section configured to generate and output data based on the position and posture information.

Still another mode of the present invention relates to a device for position and posture acquisition. The device for position and posture acquisition is captured by an imaging apparatus with an exposure time shorter than a period of one frame, and position and posture information regarding the device is acquired by an information processing apparatus using a captured moving image. The device includes a light-emitting marker, a control information acquiring section configured to acquire requests associated with light emission from the information processing apparatus, and a control section configured to cause, in response to a first one of the requests, the light-emitting marker to repetitively emit light in a predetermined flashing pattern in a minimum unit being a time obtained by dividing the period of the one frame by a predetermined number, and to cause, in response to a second one of the requests, the light-emitting marker to emit light at a light emission time point corresponding to the exposure time indicated on a time axis of the device for a fixed period of time equal to or shorter than the exposure time.

Yet another mode of the present invention relates to a device information acquisition method. The device information acquisition method includes the steps of acquiring data on a moving image obtained by an imaging apparatus capturing a device including a light-emitting marker with an exposure time shorter than a period of one frame, requesting the device to cause the light-emitting marker to emit light in a predetermined flashing pattern in a minimum unit being a time obtained by dividing the period of the one frame by a predetermined number, identifying the exposure time on a time axis of the device, based on whether or not an image of the light-emitting marker appears in a predetermined number of frames of the moving image obtained by capturing the device, requesting the device to cause the light-emitting marker to emit light at a light emission time point corresponding to the exposure time, acquiring position and posture information regarding the device based on the image in a frame of the moving image of the light-emitting marker emitting light at the light emission time point for a fixed period of time equal to or shorter than the exposure time, and generating and outputting data based on the position and posture information.

Note that, optional combinations of the above-mentioned components or the above expressions of the present invention converted between different forms, such as methods, apparatuses, systems, computer programs, and recording media having recorded thereon the computer programs, are also effective as modes of the present invention.

Advantageous Effect of Invention

According to the present invention, it is possible to acquire information regarding objects at stable accuracy by using captured images.

DESCRIPTION OF EMBODIMENT

Figure 1:
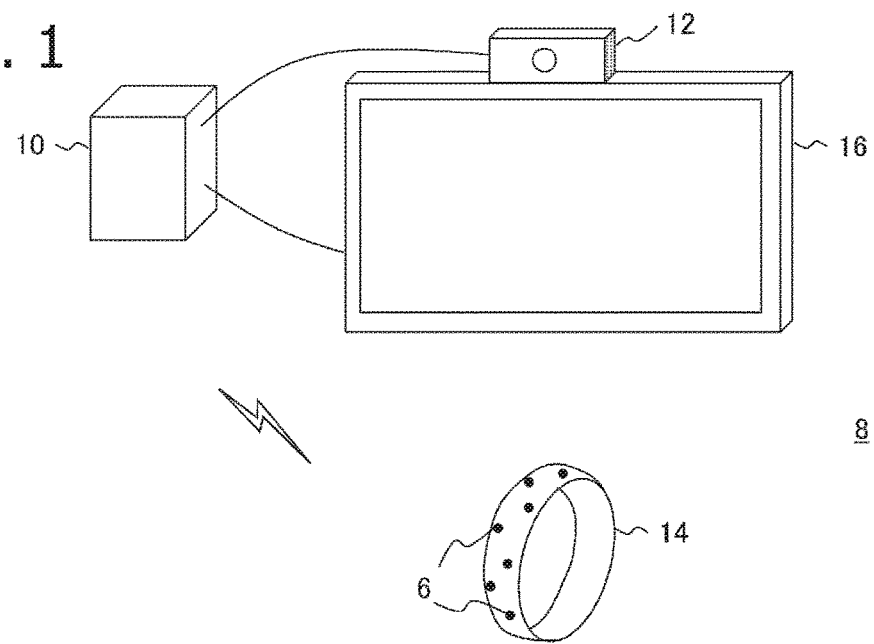
FIG. 1 is a diagram illustrating a configuration example of an information processing system to which the present embodiment is applicable.

FIG. 1 illustrates a configuration example of an information processing system to which the present embodiment is applicable. An information processing system 8 includes a light-emitting device 14, an imaging apparatus 12 configured to capture a space including the light-emitting device 14, an information processing apparatus 10 configured to analyze captured images to perform information processing, and a display apparatus 16 configured to output results of processing by the information processing apparatus 10.

In this example, the light-emitting device 14 communicates with the information processing apparatus 10 by known wireless communication means such as Bluetooth (registered trademark). Further, the imaging apparatus 12 and the display apparatus 16 communicate with the information processing apparatus 10 with cables. However, the components may communicate with each other by communication connection means other than the ones described above. Further, the illustrated modes are exemplary and not intended to limit the shapes and configurations of the apparatuses. For example, the information processing apparatus 10 and the imaging apparatus 12, or the information processing apparatus 10, the imaging apparatus 12, and the display apparatus 16 may be implemented as an integrated apparatus.

The display apparatus 16 may not be a flat-panel display as illustrated in FIG. 1 and may be, for example, a head-mounted display configured to display images in front of the eyes of the user wearing the head-mounted display. In this case, the imaging apparatus 12 may be provided to the head-mounted display to capture an image corresponding to the line of sight of the user. Alternatively, the light-emitting device 14 may be mounted on the external surface of the head-mounted display, and the imaging apparatus 12 may capture the light-emitting device 14.

The light-emitting device 14 provides, when being held by the user, for example, its position, posture, movement, and the like as input information through captured images. In the example illustrated in FIG. 1, the light-emitting device 14 includes a ring-like casing with a large number of point-like light-emitting markers (for example, light-emitting markers 6) arranged on the surface thereof. The light-emitting markers 6 each include an element capable of being switched between the on state and the off state such as an LED (Light Emitting Diode). The information processing apparatus 10 can control the switching of the light-emitting markers 6.

Note that, the shape of the light-emitting device 14 and the shape, size, and number of the light-emitting markers 6 are not limited to the ones illustrated in FIG. 1. For example, a user-holdable object having an optional shape may be connected to one or a plurality of light-emitting bodies having an optional shape and including light-emitting elements. Alternatively, an apparatus including a general game controller provided with light-emitting markers may serve as the light-emitting device 14. Still alternatively, one or a plurality of the light-emitting devices 14 may directly be mounted on the user's body. Further, the light-emitting device 14 preferably includes a gyroscope and an accelerometer configured to acquire the angular velocity and acceleration of the light-emitting device 14 itself. In the following, these sensors are collectively referred to as an "IMU sensor."

The imaging apparatus 12 includes a camera configured to capture a space including the light-emitting device 14 at a predetermined frame rate, and a mechanism configured to perform general processing, such as demosaicing, on an output signal from the camera to generate output data on the captured image and to transmit the output data to the information processing apparatus 10. The camera includes a visible light sensor used in a general digital video camera, such as a CCD (Charge Coupled Device) sensor or a CMOS (Complementary Metal Oxide Semiconductor) sensor. However, a sensor capable of detecting light in an optional wavelength band may be used as long as the sensor allows the camera to acquire the images of the light-emitting markers 6 of the light-emitting device 14.

Further, the imaging apparatus 12 of the present embodiment uses an exposure time shorter than that in general image-capturing conditions to accurately detect the images of the light-emitting markers 6 emitting light. Thus, in a case where captured images obtained with a general exposure time are required to generate display images, for example, the exposure time may be changed in units of frames or a dedicated imaging apparatus may be separately introduced. That is, the number of the imaging apparatus 12 included in the information processing system 8 is not limited.

Further, the imaging apparatus 12 may include only one camera or incorporate what is called a stereo camera in which two cameras are disposed side by side with a known distance therebetween. In the case where a stereo camera is introduced, the light-emitting device 14 is captured from the left and right different point of views, and a distance to the light-emitting device 14 is obtained by the principles of triangulation on the basis of the position shifts on the captured images.

The information processing apparatus 10 performs required information processing by using the data on the captured image transmitted from the imaging apparatus 12, to thereby generate output data such as images and sound. In the present embodiment, the information processing apparatus 10 at least identifies the position and posture of the light-emitting device 14 on the basis of the images of the light-emitting markers 6 appearing in the captured image. When the shape of the light-emitting device 14 and the positions of the light-emitting markers 6 on the surface of the light-emitting device 14 are known, the position and posture of the light-emitting device 14 can be estimated on the basis of the distribution of the images of the light-emitting markers 6 on the captured image. Also in a case where a single light-emitting body is used as a light-emitting marker, the position and the like of the light-emitting device 14 can be acquired from the size and shape of the image of the light-emitting marker.

By repeating this processing in units of frames of the captured image, the movements of the light-emitting device 14, namely, the movements of the user, can be identified, so that information processing such as a video game can be performed using the movements as command inputs. Alternatively, an image in which the image of the light-emitting device 14 in the captured image is replaced by a virtual object or an image in which the light-emitting device 14 is interacting with surrounding real objects can be generated. The information processing apparatus 10 performs any processing by utilizing the information regarding the position and posture of the light-emitting device 14 and may perform processing appropriately determined depending on functions that the user wants or the contents of applications.

The display apparatus 16 includes a general display configured to display images, such as a liquid-crystal display or an organic EL (Electroluminescence) display, a speaker configured to output sound, and the like. The display apparatus 16 outputs images and sound generated by the information processing apparatus 10 as information processing results. As described above, the display apparatus 16 may be a head-mounted display or the like and may have any form as long as the display apparatus 16 can output images and sound. Further, the results of processing performed by the information processing apparatus 10 may be recorded on a recording medium or a storage apparatus or may be transmitted to another apparatus via a network, which is not illustrated. That is, the information processing system 8 does not necessarily include the display apparatus 16 and may include those output mechanisms instead of the display apparatus 16.

Figure 2:
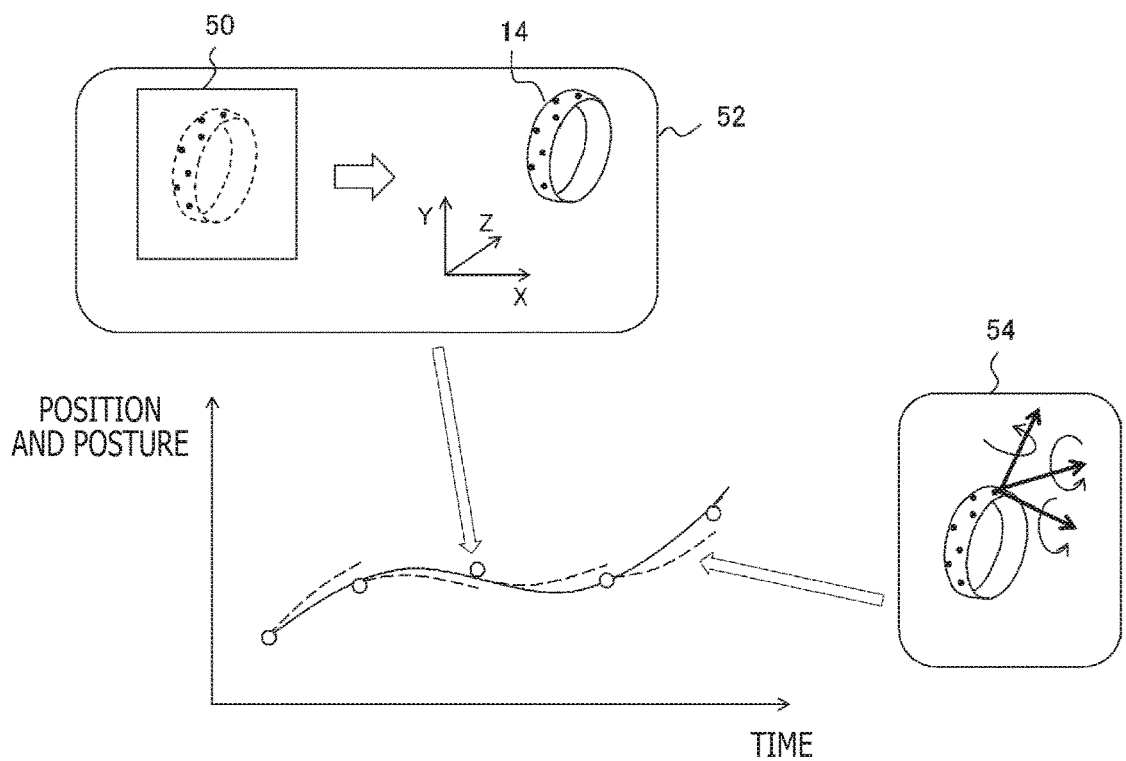
FIG. 2 is a diagram illustrating a method by which an information processing apparatus acquires a position and a posture of a light-emitting device in the present embodiment.

FIG. 2 is a diagram illustrating a method by which the information processing apparatus 10 acquires the position and posture of the light-emitting device 14 in the present embodiment. The information processing apparatus 10 acquires a captured image 50 from the imaging apparatus 12 at a predetermined rate. The captured image 50 depicts the images of the light-emitting markers in a known color at relatively high luminance. Thus, the information processing apparatus 10 extracts such images of the light-emitting markers, thereby identifying the three-dimensional position and posture of the light-emitting device 14 by using the following general conversion formula.

[Math. 1]

$$S \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} r_{12} r_{13} t_1 \\ r_{21} r_{22} r_{23} t_2 \\ r_{31} r_{32} r_{33} t_3 \end{bmatrix} \begin{bmatrix} X \\ Y \\ Z \\ 1 \end{bmatrix} \quad \text{(expression 1)}$$

Here, (u, v) indicates the position of the image of the light-emitting marker in the captured image, ($f_x$, $f_y$) indicates the focal length of the imaging apparatus 12, ($c_x$, $c_y$) indicates the principal point of the image, the matrix with elements of $r_{11}$ to $r_{33}$ and $t_1$ to $t_3$ is a rotation and translation matrix, and (X, Y, Z) indicates the three-dimensional position of the light-emitting marker when the light-emitting device 14 is at a reference position with a reference posture. The equation is solved for the plurality of light-emitting markers with (u, v), ($f_x$, $f_y$), ($c_x$, $c_y$), and (X, Y, Z) having known values, so that a rotation and translation matrix common to the light-emitting markers is obtained. The position and posture of the light-emitting device 14 are obtained on the basis of the angle and translation amount represented by this matrix. This processing is referred to as "image analysis processing 52."

Meanwhile, the information processing apparatus 10 also acquires, from the IMU sensor incorporated in the light-emitting device 14, the angular velocity and acceleration of the light-emitting device 14 at a predetermined rate, to thereby acquire the position and posture of the light-emitting device 14. This is referred to as "sensor value analysis processing 54." In FIG. 2, an actual change in position or posture of the light-emitting device 14 over time and the processing results of the image analysis processing 52 and the sensor value analysis processing 54 are schematically illustrated in the single graph. The actual change of the light-emitting device 14 is indicated by the solid line, the results obtained by the image analysis processing 52 are indicated by the white circles, and the results obtained by the sensor value analysis processing 54 are indicated by the dotted lines.

Information obtained from the IMU sensor includes the rotational speed and translational acceleration of the light-emitting device 14. Thus, in the sensor value analysis processing 54, with initial points being a position and a posture at a previous time point, the amounts of change in position and posture obtained by the integration of the speed and the acceleration are added, so that a position and a posture at a next time point are calculated. As the initial points here, the results of the image analysis processing 52 can be utilized. However, while the imaging apparatus 12 captures images at approximately 60 Hz (60 frame/second), the IMU sensor can perform measurement at a high frequency of approximately 1,600 Hz. Thus, as compared to the results of the image analysis processing 52 that are discrete as indicated by the white circles, the sensor value analysis processing 54 can follow the position and the posture at remarkably short intervals as indicated by the dotted lines.

However, since the sensor value analysis processing 54 including the integration of the speed and the acceleration accumulates errors, the results tend to deviate from the actual position and posture indicated by the solid line over time. The results of the image analysis processing 52 are thus integrated with a Kalman filter to obtain the position and posture of the light-emitting device 14 continuously and accurately. The method that achieves high accuracy by integrating the results of analysis by the imaging apparatus 12 and the IMU sensor including the plurality of sensors in this way is known as "sensor fusion."

In sensor fusion, time points at which values are acquired by each sensor are required to be indicated on a common time axis. In the case of the present embodiment, on the time axis that is the horizontal axis of FIG. 2, the time points at which the images used in the image analysis processing 52 have been captured, and the time points at which the angular velocities and acceleration used in the sensor value analysis processing 54 have been measured are accurately set, so that the position and posture of the light-emitting device 14 is obtained with a higher accuracy by the integration of the results.

Meanwhile, to enhance the accuracy of the image analysis processing 52, it is effective to shorten the exposure time of the imaging apparatus 12 and the light emission time of the light-emitting markers as much as possible. That is, in a general captured image, the images of the light-emitting markers are expressed at luminance similar to that of the images of light reflected by other objects or lighting, and it is thus difficult to tell which is which in some cases. Further, the difficulty in distinction changes depending on surrounding brightness or the like. The shorter the exposure time, the larger a difference in luminance between the images of objects emitting strong light and other objects, with the result that the images of the light-emitting markers can be detected with high robustness.

Further, the light-emitting device 14 is supposed to be moved, and hence when the light emission time of the light-emitting markers is long, the images are blurred, resulting in a difficulty in detection and large errors of the position coordinates of the images that are used for analysis. When less blurred images can be captured with the shortest possible light emission time, the positions on the captured image can accurately be acquired, and the accuracy of the analysis result can thus be enhanced. Further, the image-time point correspondence can be clarified, which is effective in the sensor fusion described above. Further, since the light-emitting device 14 is caused to emit light for a short period of time with small power consumption, the light-emitting device 14 can be used as the battery power supply for a long period of time.

Figure 3:
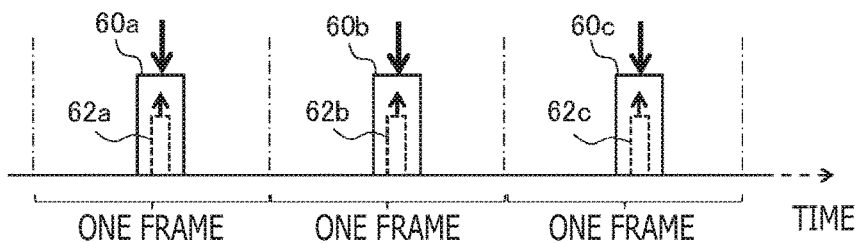
FIG. 3 is a diagram exemplifying a relation between an exposure time of an imaging apparatus and a light emission time of light-emitting markers in the present embodiment.

FIG. 3 exemplifies a relation between the exposure time of the imaging apparatus 12 and the light emission time of the light-emitting markers 6 in the present embodiment. In FIG. 3, the horizontal axis indicates elapsed time and the time divisions with the dashed-dotted lines indicate image-capturing periods per frame. For example, in the case of a frame rate of 60 frame/second, the image-capturing period is approximately 16.6 msec. Meanwhile, in the present embodiment, in the frames, exposure times 60a, 60b, and 60c are set to 500 μsec, and light emission times 62a, 62b, and 62c of the light-emitting markers 6 are set to 100 μsec, for example.

However, the exposure time and the light emission time are only required to be optimized depending on light emission luminance or surrounding brightness and are not limited to specific times. In any case, the exposure times 60a, 60b, and 60c and the light emission times 62a, 62b, and 62c of the light-emitting markers 6 are desirably the shortest possible times that allow the light-emitting markers 6 to be expressed at luminance high enough to achieve image detection from a captured image. Qualitatively, necessary conditions include determining a light emission time that allows light emitted at a certain moment to be expressed as an image, and determining an exposure time equal to or longer than the light emission time.

Further, as illustrated in FIG. 3, the light emission times 62a, 62b, and 62c are set to the times entirely included in the exposure times 60a, 60b, and 60c, so that the images of the light-emitting markers 6 always appear at similar luminance in a captured image. For example, the exposure time is set to a time approximately several times longer than the light emission time, so that the subtle shifts of the light emission time point can be prevented from affecting images.

Further, in a case where the sensor fusion described above is implemented, correlations between the time points of measurement by the IMU sensor and exposure time points are desirably acquired with high accuracy. Since the light-emitting device 14 and the imaging apparatus 12 operate with the respective independent clocks, in the present embodiment, the clocks are set on a common time axis through control. Specifically, first, the reference time points of the exposure times 60a, 60b, and 60c and the reference time points of the light emission times 62a, 62b, and 62c are adjusted to each other.

In the example illustrated in FIG. 3, as indicated by the arrows, the intermediate time points (time points at the middle of the entire times) of the exposure times 60a, 60b, and 60c are set as references, and the intermediate time points of the light emission time 62a, 62b, and 62c are adjusted thereto. In the following, the intermediate time point of the light emission time is sometimes simply referred to as a "light emission time point." With this, a light emission time point recognized by the light-emitting device 14 is an image-capturing time point. Further, even when the light emission time 62a, 62b, or 62c slightly shifts, the light emission time does not easily get out of the exposure time 60a, 60b, or 60c.

Figure 4:
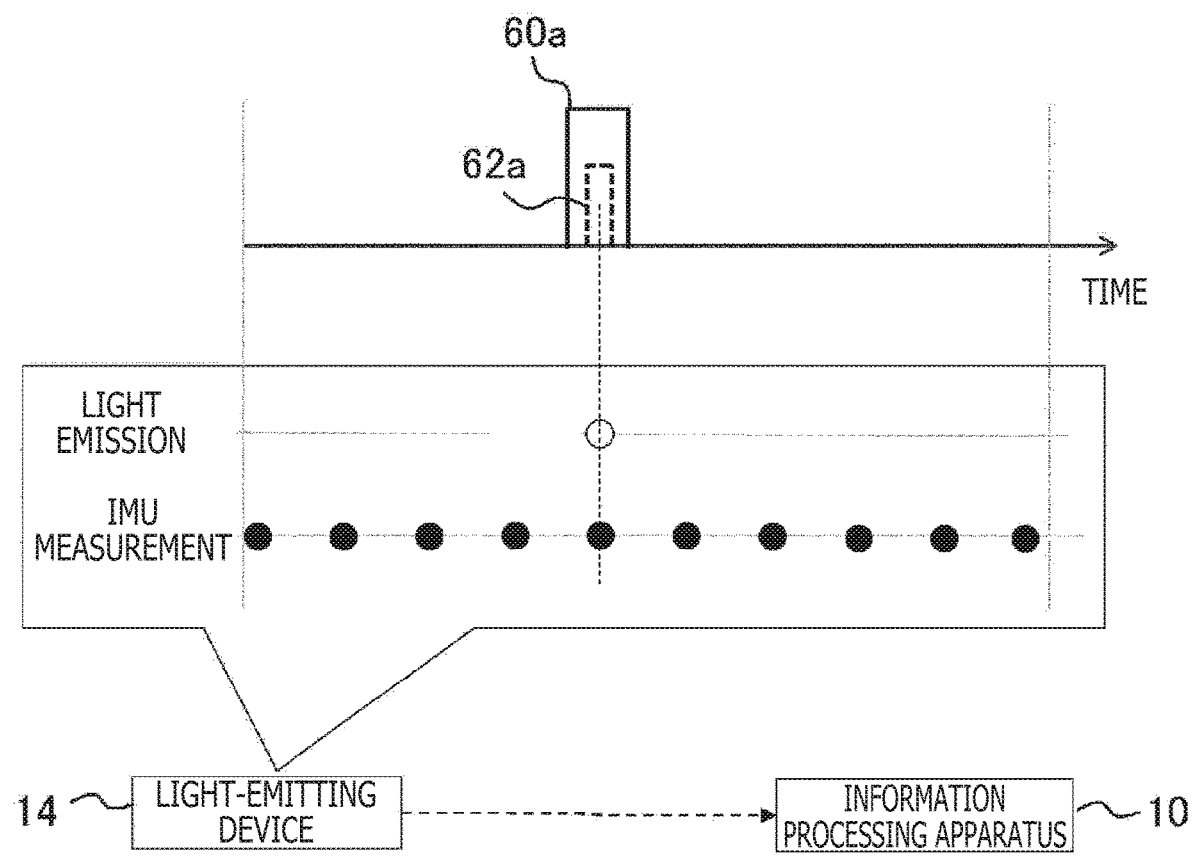
FIG. 4 is a diagram exemplifying a temporal relation between light emission and measurement by an IMU (Inertial Measurement Unit) sensor in the light-emitting device of the present embodiment.

FIG. 4 exemplifies a temporal relation between light emission and measurement by the IMU sensor in the light-emitting device 14 of the present embodiment. In the upper part of FIG. 4, the exposure time 60a and the light emission time 62a in the image-capturing period for one frame on the time axis illustrated in FIG. 3 are illustrated. In this image-capturing period, the IMU sensor measures the angular velocity and acceleration of the light-emitting device 14 at high frequency. In the middle part of FIG. 4, on the same time axis as in the upper part, the light emission time point of the light-emitting markers 6 (white circle) and the time points of measurement by the IMU sensor (black circles) are illustrated in parallel.

The light-emitting device 14 acquires the light emission time point and the measurement time points on the internal time axis. Thus, the light-emitting device 14 transmits, as illustrated in the lower part of FIG. 4, the time point at which the light-emitting markers 6 have been caused to emit light together with the results of measurement by the IMU sensor and the measurement time points to the information processing apparatus 10. The light emission time point is adjusted to the intermediate time point of the exposure time as illustrated in FIG. 3, so that the information processing apparatus 10 can express, on the basis of the transmitted light emission time point, the image-capturing time point and the time points of measurement by the IMU sensor on the same time axis.

With such a mechanism, the sensor value analysis processing 54 and the image analysis processing 52 can be integrated as illustrated in FIG. 2, and the position and posture of the light-emitting device 14 can thus continuously and accurately be acquired. The information processing apparatus 10 achieves the state as illustrated in FIG. 3, in which the image capturing and the light emission are synchronized with each other, before operating a video game, for example, and monitors shifts as background processing during operation to maintain the state. The information processing apparatus 10 corrects the shifts as needed.

Figure 5:
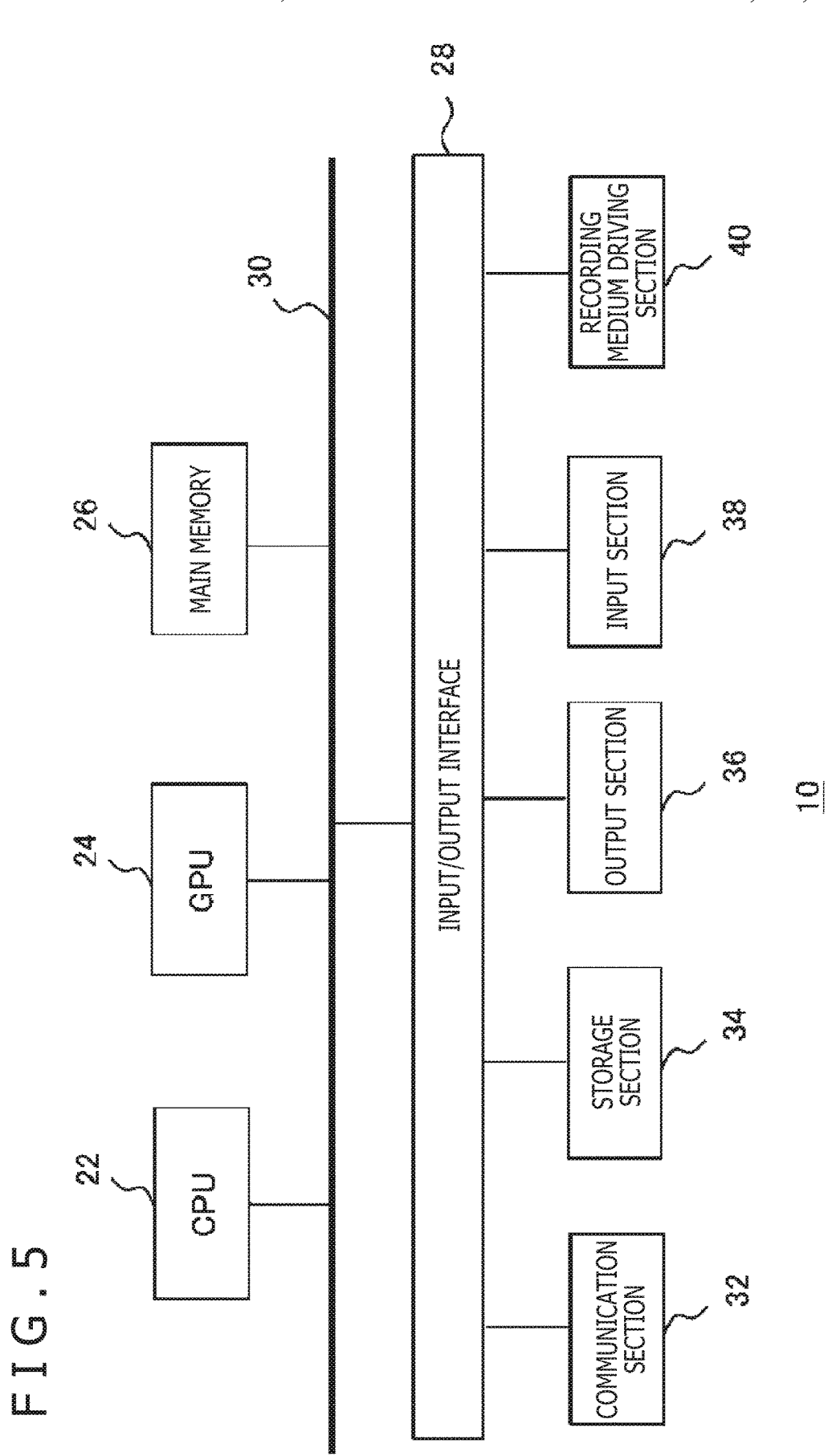
FIG. 5 is a diagram illustrating an internal circuit configuration of the information processing apparatus in the present embodiment.

FIG. 5 illustrates the internal circuit configuration of the information processing apparatus 10. The information processing apparatus 10 includes a CPU (Central Processing Unit) 22, a GPU (Graphics Processing Unit) 24, and a main memory 26. These sections are connected to each other via a bus 30. An input/output interface 28 is also connected to the bus 30. A communication section 32, a storage section 34, an output section 36, an input section 38, and a recording medium driving section 40 are connected to the input/output interface 28. The communication section 32 includes a peripheral interface such as a USB (Universal Serial Bus) or IEEE (Institute of Electrical and Electronics Engineers) 1394 or a wired or wireless LAN (Local Area Network) network interface. The storage section 34 is a hard disk drive, a nonvolatile memory, or the like. The output section 36 outputs data to the display apparatus 16 or the light-emitting device 14. The input section 38 receives data from the imaging apparatus 12 or the light-emitting device 14. The recording medium driving section 40 drives removable recording media such as magnetic disks, optical discs, or semiconductor memories.

The CPU 22 controls the whole information processing apparatus 10 by executing the operating system stored in the storage section 34. The CPU 22 also executes various programs that are either read from a removable recording medium and loaded into the main memory 26 or downloaded via the communication section 32. The GPU 24 has a geometry engine function and a rendering processor function. The GPU 24 performs drawing processing in accordance with drawing instructions from the CPU 22 and stores the display images in a frame buffer, which is not illustrated. Then, the GPU 24 converts the display images stored in the frame buffer into video signals and outputs the video signals to the output section 36. The main memory 26 includes a RAM (Random Access Memory) and stores programs and data required for processing.

Figure 6:
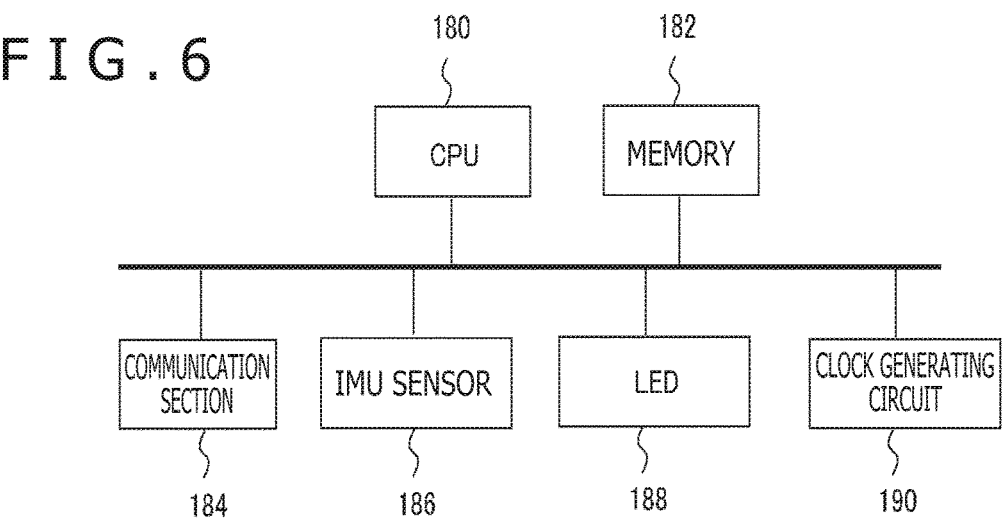
FIG. 6 is a diagram illustrating the internal circuit configuration of the light-emitting device in the present embodiment.

FIG. 6 illustrates the internal circuit configuration of the light-emitting device 14. The light-emitting device 14 includes a CPU 180, a memory 182, a communication section 184, an IMU sensor 186, an LED 188, and a clock generating circuit 190. The CPU 180 controls the circuits of the light-emitting device 14 and data transmission between the circuits. In the present embodiment, in particular, the CPU 180 receives requests from the information processing apparatus 10 to control the on and off of the LED 188 or measurement by the IMU sensor 186, or to correct the internal clock. The memory 182 stores data required for processing in the CPU 180. In the present embodiment, in particular, the memory 182 stores the light emission timing patterns of the LED 188 and various correction values.

The communication section 184 is an interface for data transmission with the information processing apparatus 10 and can be implemented with a known wireless communication technology such as Bluetooth (registered trademark). The IMU sensor 186 includes a gyroscope and an accelerometer and acquires the angular velocity and acceleration of the light-emitting device 14. Values output from the sensor are transmitted to the information processing apparatus 10 via the communication section 184. The LED 188 is an element configured to emit light in a predetermined color or a set of such elements, and forms the light-emitting marker 6 illustrated in FIG. 1. The clock generating circuit 190 is a circuit configured to generate the clock of the light-emitting device 14 and has a function of correcting the clock frequency, under the control of the CPU 180.

Figure 7:
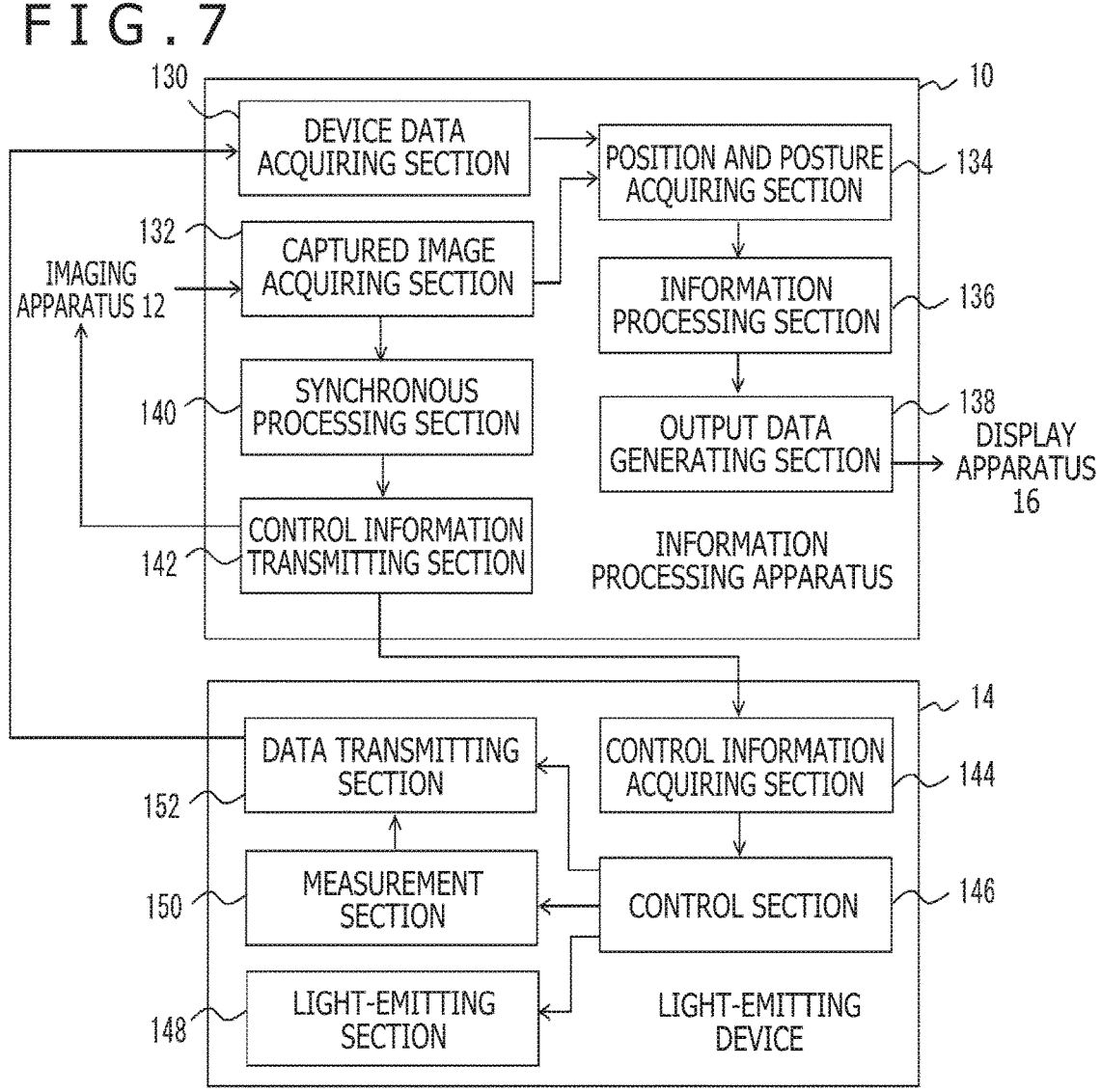
FIG. 7 is a diagram illustrating functional block configurations of the information processing apparatus and the light-emitting device in the present embodiment.

FIG. 7 illustrates the functional block configurations of the information processing apparatus 10 and the light-emitting device 14. The functional blocks illustrated in FIG. 7 can be implemented, in terms of hardware, by the configurations illustrated in FIG. 5 and FIG. 6, such as the CPU, the GPU, or the memory. The functional blocks can be implemented, in terms of software, by a program loaded from a recording medium or the like into the memory to achieve various functions such as a data input function, a data retaining function, an image processing function, and an input/output function. Thus, it is understood by those skilled in the art that the functional blocks can be implemented in various forms from only hardware, only software, or a combination thereof and are not limited to any of them.

The information processing apparatus 10 includes a device data acquiring section 130, a captured image acquiring section 132, a position and posture acquiring section 134, an information processing section 136, an output data generating section 138, a synchronous processing section 140, and a control information transmitting section 142. The device data acquiring section 130 acquires, from the light-emitting device 14, data on values measured by the sensor and various time points. The captured image acquiring section 132 acquires data on captured images from the imaging apparatus 12. The position and posture acquiring section 134 acquires the position and posture of the light-emitting device 14 by using values measured by the IMU sensor and captured images. The information processing section 136 performs information processing on the basis of the position and posture of the light-emitting device 14. The output data generating section 138 generates and outputs data indicating the results of information processing. The synchronous processing section 140 synchronizes the exposure of the imaging apparatus 12 and the light emission of the light-emitting device 14. The control information transmitting section 142 transmits, to the light-emitting device 14, control information associated with light emission and time point correction.

The device data acquiring section 130 is implemented by the input section 38, the communication section 32, the CPU 22, and the main memory 26 of FIG. 5, for example. The device data acquiring section 130 acquires, from the light-emitting device 14, values measured by the IMU sensor 186, that is, angular velocity and acceleration at the predetermined rate. At this time, the device data acquiring section 130 also acquires time points at which the measured values have been obtained and time points at which the light-emitting markers have been caused to emit light in parallel to the measurement. The device data acquiring section 130 supplies the acquired information to the position and posture acquiring section 134. The captured image acquiring section 132 is implemented by the input section 38, the CPU 22, and the main memory 26 of FIG. 5, for example. The captured image acquiring section 132 acquires sequentially data on a captured image obtained by image capturing by the imaging apparatus 12 at a predetermined frame rate and supplies the data to the position and posture acquiring section 134.

The position and posture acquiring section 134 is implemented by the CPU 22, the GPU 24, and the main memory 26 of FIG. 5, for example. The position and posture acquiring section 134 detects the images of the light-emitting markers from a captured image and acquires the position and posture of the light-emitting device 14 with Expression 1. The position and posture acquiring section 134 acquires the position and posture of the light-emitting device 14 also by integration based on angular velocity and acceleration measured by the IMU sensor. Then, both results are integrated as described with FIG. 2, so that position and posture information is generated at a predetermined rate. Here, as described above, the position and posture acquiring section 134 expresses the time points of measurement by the IMU sensor 186 and the light emission time point of the light-emitting markers, namely, the image-capturing time point, on the same time axis, to thereby enhance the accuracy of position and posture acquisition.

The information processing section 136 is implemented by the CPU 22 and the main memory 26 of FIG. 5, for example. The information processing section 136 performs predetermined information processing on the basis of the position and posture of the light-emitting device 14. As described above, the details of the processing are not particularly limited. The information processing section 136 may cause a video game to progress with input information being the movements of the user or may replace the light-emitting device 14 by a virtual object and perform physical calculation to achieve augmented reality. It will be understood by those skilled in the art that various types of information processing other than the above can be implemented.

The output data generating section 138 is implemented by the GPU 24, the main memory 26, the output section 36, and the communication section 32 of FIG. 5, for example. The output data generating section 138 generates data on images and sound to be output as the results of information processing by the information processing section 136. The contents of data to be generated depend on the details of information processing. In a case where images and sound are generated, the output data generating section 138 outputs generated data to the display apparatus 16 at a predetermined rate. However, as described above, the output destination is not limited to the display apparatus and may be a recording medium, a storage apparatus, a network, or the like.

The synchronous processing section 140 is implemented by the CPU 22 and the main memory 26 of FIG. 5, for example. The synchronous processing section 140 synchronizes image capturing by the imaging apparatus 12 and the light emission of the light-emitting markers 6. That is, the synchronous processing section 140 performs adjustment processing so that the intermediate time point of the exposure time and the light emission time point of the light-emitting markers 6 match each other as illustrated in FIG. 3. Specifically, the synchronous processing section 140 causes the light-emitting markers 6 to emit light in a predetermined pattern in the time direction and checks how the light appears in a captured image, to thereby determine a time point on the time axis inside the light-emitting device 14 at which the light-emitting markers 6 are to be caused to emit light.

This processing includes a first stage in which whether light is emitted at least within the exposure time is evaluated in units of time similar to the exposure time, and a second stage in which the intermediate time point of the exposure time and the light emission time point are finely adjusted to each other. The first stage is performed as initial calibration before the processing of operating a video game, for example. The second stage, in which light is emitted for the same light emission time as during operation, can be performed as the background processing during operation. In the background processing, shifts due to a clock difference between the imaging apparatus 12 and the light-emitting device 14 are monitored to correct the clock. The details of the processing are described later.

The control information transmitting section 142 is implemented by the CPU 22, the output section 36, and the communication section 32 of FIG. 5, for example. The control information transmitting section 142 transmits, to the light-emitting device 14, information or requests required for the synchronous processing section 140 to achieve synchronization. Specifically, the control information transmitting section 142 transmits light emission pattern specification, light emission time point correction requests, clock correction requests, or the like. The control information transmitting section 142 may also transmit control information associated with the start/stop of measurement by the IMU sensor or the start/stop of image capturing by the imaging apparatus 12 to the light-emitting device 14 or the imaging apparatus 12. The exposure time of the imaging apparatus 12 may be set to the imaging apparatus 12 itself in advance or may be specified by the control information transmitting section 142.

The light-emitting device 14 includes a control information acquiring section 144, a control section 146, a light-emitting section 148, a measurement section 150, and a data transmitting section 152. The control information acquiring section 144 acquires control information from the information processing apparatus 10. The control section 146 controls light emission, measurement, and the clock on the basis of control information. The light-emitting section 148 causes the LED 188 to emit light. The measurement section 150 measures angular velocity and acceleration. The data transmitting section 152 transmits necessary data such as measured values to the information processing apparatus 10. The control information acquiring section 144 is implemented by the communication section 184 and the CPU 180 of FIG. 6, for example. The control information acquiring section 144 acquires control information transmitted from the information processing apparatus 10.

The control section 146 is implemented by the CPU 180, the memory 182, and the clock generating circuit 190 of FIG. 6, for example. The control section 146 causes, on the basis of the control information, the light-emitting section 148 and the measurement section 150 to operate, and generates the clock. The control information from the information processing apparatus 10 includes identification information specifying light emission patterns indicating temporal changes in flashing state. Thus, the control section 146 holds therein information having the identification information and the light emission patterns associated with each other.

Besides, the control information may include various types of information regarding light emission time point correction values, the start/stop of light emission, light emission luminance, light emission colors, or the start/stop of measurement by the IMU sensor. The control section 146 appropriately causes, on the basis of those pieces of information, the light-emitting section 148 and the measurement section 150 to operate. Further, when the control information includes a clock correction request, the control section 146 corrects the frequency of the clock generated inside the control section 146.

The light-emitting section 148 is implemented by the LED 188 of FIG. 6. The light-emitting section 148 causes, under the control of the control section 146, the element to emit light in a specified pattern or at a specified timing. The measurement section 150 is implemented by the IMU sensor 186 of FIG. 6. The measurement section 150 measures, under the control of the control section 146, the angular velocity and acceleration of the light-emitting device 14 at a predetermined frequency. The data transmitting section 152 is implemented by the CPU 180, the memory 182, and the communication section 184 of FIG. 6, for example. The data transmitting section 152 sequentially transmits, to the information processing apparatus 10, the values of angular velocity and acceleration measured by the measurement section 150 together with the measurement time points. The data transmitting section 152 also sequentially transmits, to the information processing apparatus 10, time points at which the light-emitting section 148 has emitted light.

Figure 8:
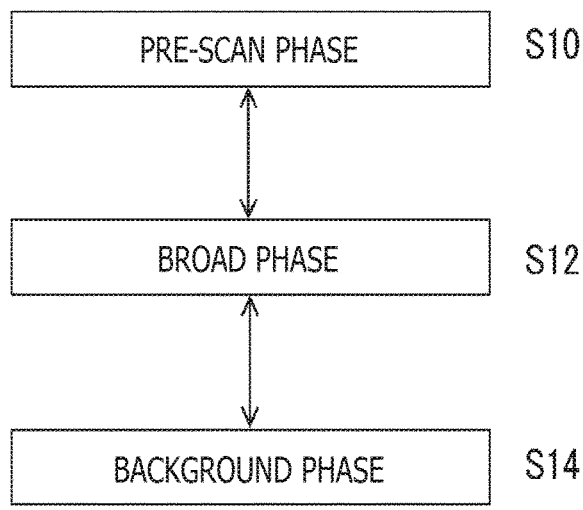
FIG. 8 is a diagram illustrating stages of processing that is performed by a synchronous processing section of the present embodiment.

Now, the details of synchronous processing that the synchronous processing section 140 of the information processing apparatus 10 performs in cooperation with the light-emitting device 14 are described. FIG. 8 illustrates the stages of the processing that is performed by the synchronous processing section 140. The synchronous processing includes, as illustrated in FIG. 8, processing in three stages of a pre-scan phase (S10), a broad phase (S12), and a background phase (S14). The pre-scan phase and the broad phase are performed before the operation of video game processing, for example. Of those, the pre-scan phase is a stage for detecting the light-emitting device 14. Thus, the light-emitting markers 6 are caused to emit light in the whole period.

The broad phase is a stage for roughly adjusting the light emission time point of the light-emitting device 14 detected in the pre-scan phase to the exposure time. Thus, the time is divided into time grids each of which is approximately equal to the exposure time, and the light-emitting markers 6 are caused to emit light in flash patterns set to the respective time grids. The light emission pattern is set over a time corresponding to a plurality of frames. With this, the range of a light emission time point that matches the exposure time is identified on the basis of how the images of the light-emitting markers 6 appear in the time direction.

The background phase is a stage for checking light emission time point shifts regularly and rigorously and correcting the light emission time point or the clock frequency of the light-emitting device 14 as needed before and during operation. Thus, the light emission time point is intentionally shifted by the light emission time during operation that is shorter than the time grid in the broad phase, and a transition timing between the state in which the light-emitting markers 6 appear in the captured image and the state in which the light-emitting markers 6 do not appear in the captured image is acquired, so that a shift of the original light emission time point from the intermediate time point of the exposure time is obtained. Then, the light emission time point is corrected to eliminate the shift. Further, the clock frequency is corrected in a direction that eliminates the shift, on the basis of the amount of shift generated per unit time.

When the images of the light-emitting markers 6 are not obtained for a predetermined period of time in the broad phase, the processing returns to the pre-scan phase and starts from the light-emitting device detection. When effective shift amounts are no longer obtained in the background phase, the processing returns to the broad phase and starts again from the light emission time point rough adjustment. In this way, the plurality of phases are provided and light is emitted in the patterns suitable therefor so that synchronization can efficiently be performed and constant monitoring during operation can be achieved.

Figure 9:
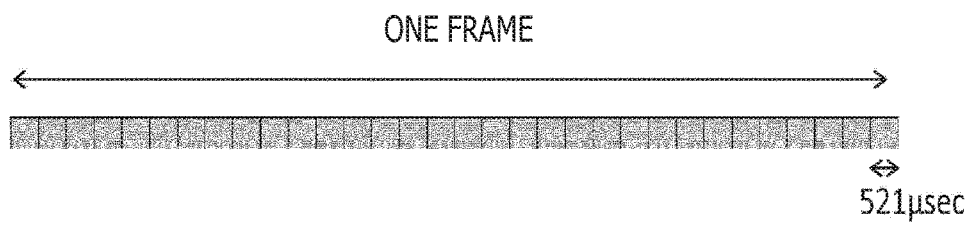
FIG. 9 is a diagram schematically illustrating a light emission pattern in a pre-scan phase of the present embodiment.

FIG. 9 schematically illustrates a light emission pattern in the pre-scan phase. The rectangle illustrated in FIG. 9 indicates an image-capturing period having a horizontal length corresponding to one frame. Basically, this time is divided into time grids each having a predetermined time, and the light-emitting device is caused to flash in units of time grids. For example, in the case of a frame rate of 60 frame/second, the image-capturing period is 16.6 msec. When the image-capturing period is divided into 32 time grids, one time grid is 521 μsec. In a case where the exposure time is set to 500 μsec as described above and time grids each of which is approximately 500 μsec are used, the exposure time and the light emission time have similar granularities, with the result that whether or not the light emission time overlaps the exposure time is roughly determined.

However, in the pre-scan phase, which is the stage for detecting the light-emitting device 14 in the field of view of the imaging apparatus 12, the light-emitting markers are on in all the time grids by PWM (Pulse Width Modulation) control. In FIG. 9, the time grids are painted out to indicate that the light-emitting markers are on. In the pre-scan phase, the synchronous processing section 140 acquires a captured image from the captured image acquiring section 132 and detects the images of the light-emitting markers 6, to thereby confirm that the light-emitting device is present in the field of view. Since the light-emitting markers are on in the whole period, the images of the light-emitting markers 6 are detected even with exposure for a short period of time of 500 μsec as long as the light-emitting device 14 is present in the field of view.

Figure 10:
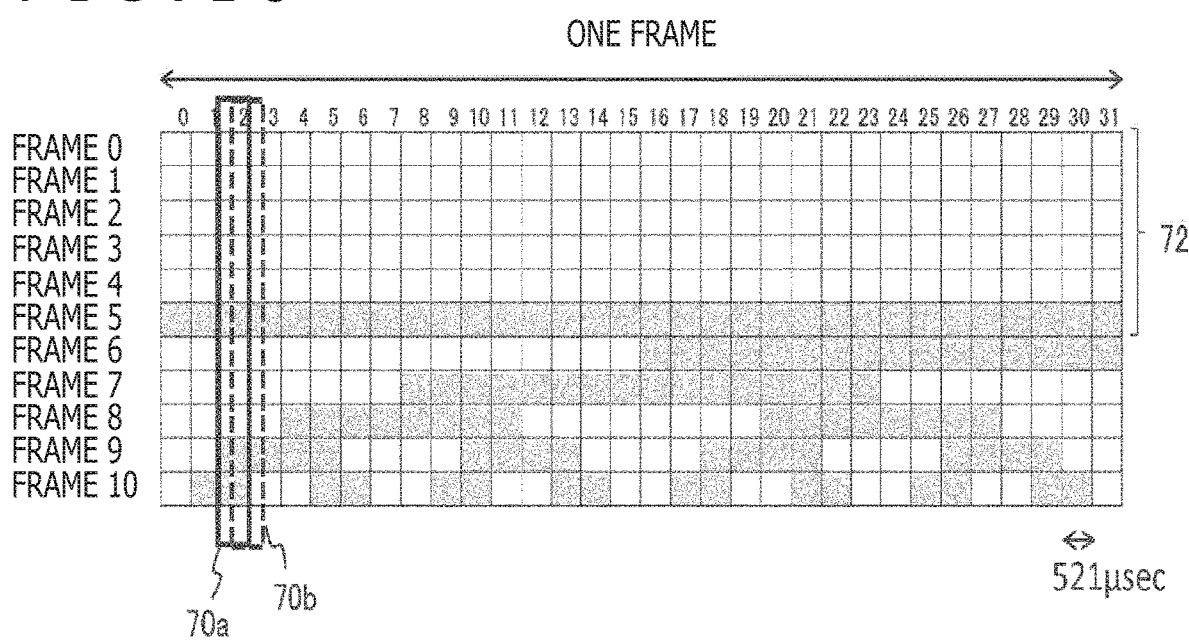
FIG. 10 is a diagram schematically illustrating an exemplary light emission pattern in a broad phase of the present embodiment.

When the presence of the light-emitting device 14 is confirmed, the processing transitions to the broad phase. FIG. 10 schematically illustrates an exemplary light emission pattern in the broad phase. A manner of representation in FIG. 10 is similar to that in FIG. 9. However, with regard to this phase in which a light emission pattern is set over a plurality of frames, changes between the frames are illustrated in the vertical direction. In the case of FIG. 10, one light emission pattern includes 11 frames of the frame 0 to the frame 10.

That is, the light-emitting markers 6 repetitively emit light in the light emission pattern in question in units of 11 frames. In a manner similar to that during operation, the imaging apparatus 12 repeats exposure for a short period of time (for example, approximately 500 μsec) at a predetermined timing in the image-capturing period in each frame. For example, it is assumed that the exposure time is set to a time indicated by a solid rectangle 70a corresponding to a time grid "2." In this case, in the first five frames (frames 0 to 4), the light-emitting markers 6 are off and no image thus appears. In the next frame 5, the light-emitting markers 6 are on in the whole period, and hence the images of the light-emitting markers 6 appear in the exposure time corresponding to the rectangle 70a.

In the next three frames (frames 6 to 8), the light-emitting markers 6 are off at this timing, so that no image appears. In the next two frames (frames 9 and 10), the light-emitting markers 6 are on so that the images of the light-emitting markers 6 appear. Of the successive 11 frames, the frames in which the images of the light-emitting markers 6 appear are indicated by "1," and the frames in which the images of the light-emitting markers 6 do not appear are indicated by "0." In the exposure time corresponding to the rectangle 70a, a numerical sequence of {0, 0, 0, 0, 0, 1, 0, 0, 0, 1, 1} is obtained in order from the frame 0. In the following, such a numerical sequence is referred to as an "image appearance pattern."

Note that, when the image exposure time extends over the on time and the off time, the luminance of images varies depending on the on time in the exposure time. A threshold is accordingly set to the luminance. Images having luminance equal to or larger than the threshold are determined as "positive," and images having luminance smaller than the threshold are determined as "negative." Further, in a case where there are a plurality of light-emitting markers, a case where at least one of the light-emitting markers appears may be determined as "positive," or a case where the number of appearing light-emitting markers is equal to or larger than a threshold may be determined as "positive."

With those reference combinations, whether the images of the light-emitting markers appear or not are indicated by the binary digits of "1" and "0." As a similar method, blob detection that detects the presence/absence of objects by image analysis is known. However, in the present embodiment, since the light-emitting markers are intentionally turned off, "negative" results are not taken as errors and the image appearance pattern acquisition continues.

The light emission pattern is set so that the different image detection patterns are obtained in all the time grids as illustrated in FIG. 10, and hence relations between the time grids of the light-emitting device 14 and the exposure time are obtained. Note that, the reason why the light-emitting markers are off in the whole period of the first five frames but are on in the whole period of the next frame is to distinguish a light emission pattern for one unit from adjacent light emission patterns. This period is referred to as a "sync pattern 72." Thus, in reality, a captured image is continuously acquired, and when an image appearance pattern having the sync pattern 72 of {0, 0, 0, 0, 0, 1} is obtained, relations between the time grids of the light-emitting device 14 and the exposure time are identified on the basis of image appearance patterns in the next five frames.

The light emission patterns following the sync pattern 72 are set so that a light emission pattern in a certain time grid does not match those in other time grids, and that the adjacent time grids are different from each other only in one frame in terms of the flashing state as described above. For example, when the time grid corresponding to the rectangle 70a (time grid "2") is a reference, only in the frame 9, in which the light-emitting markers are off in the previous time grid "1," the light-emitting markers are turned on. Further, in the following time grid "3," the light-emitting markers are changed from the on state to the off state only in the frame 10.

With the light emission pattern in which the light-emitting markers are gradually changed between the on state and the off state, even when the exposure time extends over two time grids, an error is at most one time grid. For example, in a case where the exposure time is at the timing of a dashed rectangle 70b delayed from the rectangle 70a by approximately 250 μsec, an image appearance pattern following the sync pattern is the same up to {0, 0, 0, 1} but has an intermediate value ranging from 0 to 1 as the last value depending on the degree of delay. When the value is determined with a threshold by blob detection, a numerical value of 1 or 0 is set. In any case, however, such a numerical sequence is obtained only in successive two time grids, and the exposure time can therefore be identified with almost no error. Such a feature of patterns is also seen in Gray codes that are used for expressing numerical values in digital circuits.

Note that, the light emission pattern illustrated in FIG. 10 is an example, and any light emission pattern may be employed as long as image appearance patterns are different between the time grids and the adjacent time grids are different from each other only in one frame in terms of the flashing state. Further, the size of the time grids may appropriately be adjusted on the basis of the exposure time. Qualitatively, as the number of time grids increases, the number of frames required for a light emission pattern for one unit increases.

Figure 11:
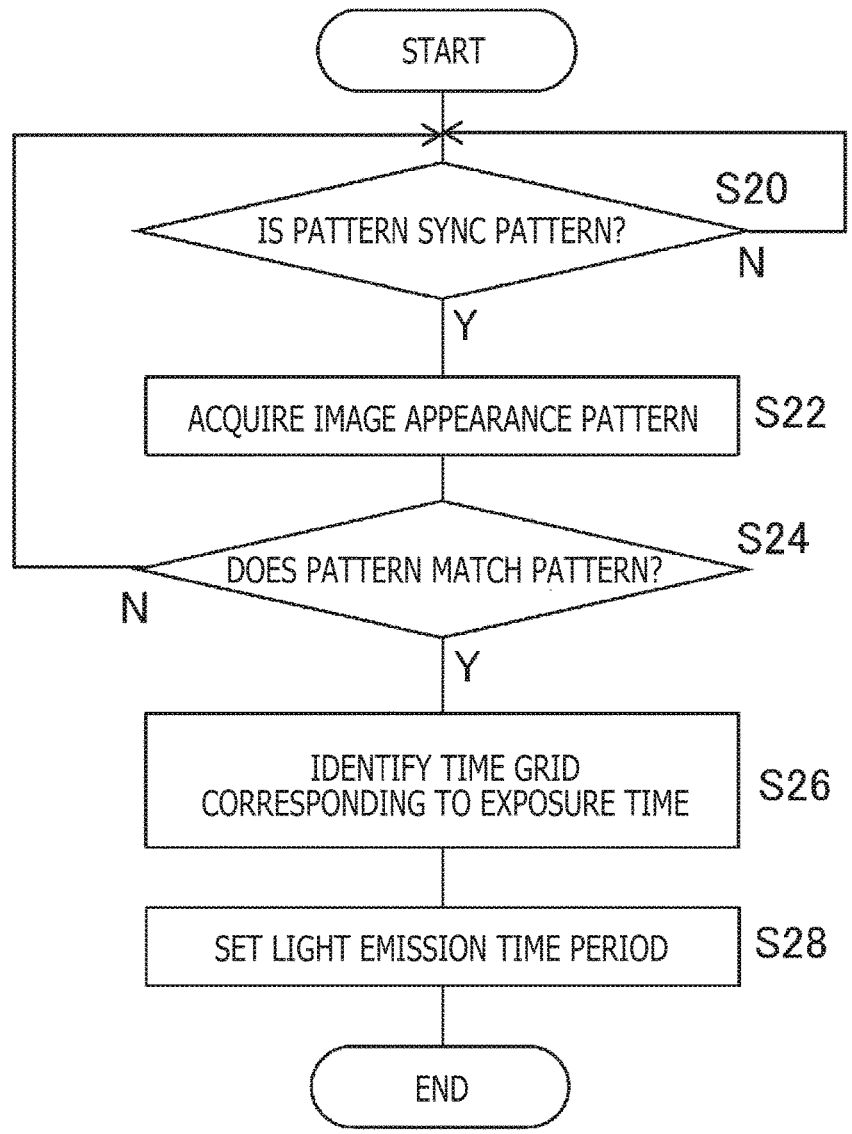
FIG. 11 is a flowchart illustrating a processing procedure by which the synchronous processing section identifies a time grid of the light-emitting device that corresponds to the exposure time in the broad phase of the present embodiment.

FIG. 11 is a flowchart illustrating a processing procedure by which the synchronous processing section 140 identifies a time grid of the light-emitting device 14 that corresponds to the exposure time in the broad phase. This flowchart starts under a state where the control information transmitting section 142 has requested the light-emitting device 14 to emit light in the light emission pattern for the broad phase, and the imaging apparatus 12 is capturing, with short-time exposure, a scene in which the light-emitting markers 6 are repetitively emitting light in the pattern as illustrated in FIG. 10, in response to the request.

Further, the synchronous processing section 140 performs the processing of acquiring data on the captured image to detect the images of the light-emitting markers in parallel. With a shorter exposure time, the images of the light-emitting markers can be more easily detected with light emission in the exposure time. Under that state, the image detection processing is repeated until an image appearance pattern that matches the sync pattern is obtained (N in S20). When such a pattern is detected (Y in S20), from the next frame, image appearance patterns for identifying the time grid are acquired (S22).

In a case where, when the frames for the light emission pattern for one unit have been captured, an image appearance pattern matches one of the variations of light emission patterns determined in advance for the respective time grids (Y in S24), it is determined that the exposure time overlaps the time grid corresponding to the pattern in question (S26). Thus, the synchronous processing section 140 generates control information that achieves light emission in the time grid in question and transmits the control information to the light-emitting device 14 through the control information transmitting section 142, to thereby set a rough light emission time period (S28).

In a case where the image appearance patterns match none of the light emission patterns set for the respective time grids in S24, the processing starts again from the sync pattern detection (N in S24). Note that, the accuracy may be enhanced as follows: the processing in S20 to S26 is repeated a plurality of times, and of the obtained results, a result obtained at the highest frequency or a result obtained a predetermined number of times first is determined as the final value of the time grid corresponding to the exposure time. Further, when no result is obtained for a predetermined period of time, the processing returns to the pre-scan phase and starts again from the light-emitting device detection.

In the broad phase, the period of time in which light is to be emitted can be determined at the granularity similar to that of the exposure time. With this, at least the exposure time and the light emission can be synchronized with each other, so that the images of the light-emitting markers certainly appear in the captured image. In a case where strict time point adjustment is not required since the results are used for sensor fusion, for example, the following background phase may be omitted and the broad phase may be regularly performed. However, when the light emission time point is adjusted to the intermediate time point of the exposure time in the background phase, high robustness against the shifts of the light emission time point due to the clock difference can be achieved.

Figure 12:
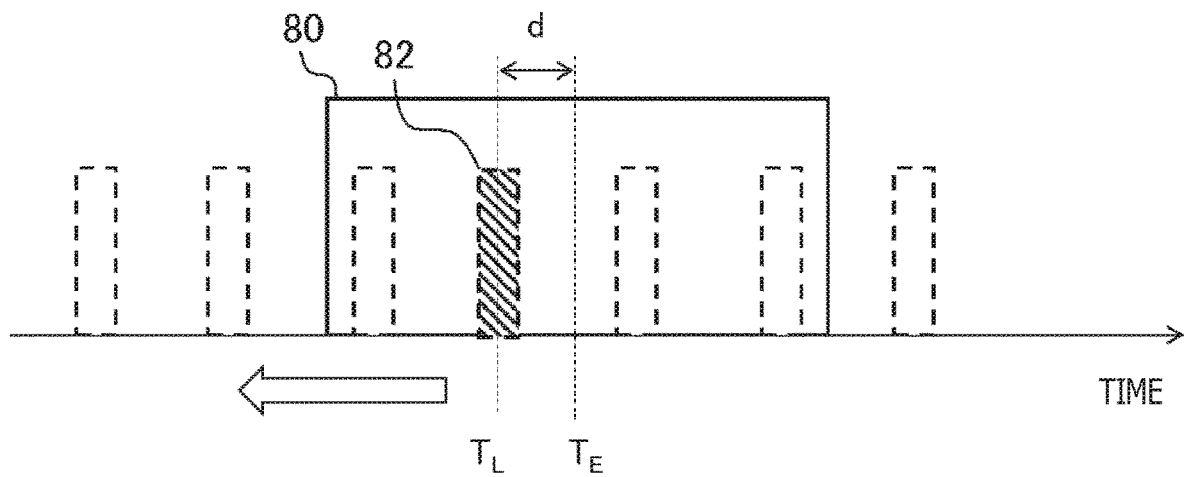
FIG. 12 is a diagram illustrating the principle of synchronous processing in a background phase of the present embodiment.

FIG. 12 is a diagram illustrating the principle of synchronous processing in the background phase. In FIG. 12, the horizontal axis indicates elapsed time, the solid rectangle indicates an exposure time 80 for one frame, and the dashed rectangles indicate the light emission times of the light-emitting markers 6 (for example, light emission time 82). However, the illustrated light emission times are for a plurality of frames. Since the background phase is basically performed during operation, the light emission time 82 is a short light emission time during operation (for example, 100 μsec). As described above, the background phase is the processing for strictly adjusting the light emission time point to the intermediate time point of the exposure time.

In the broad phase, a timing corresponding to the exposure time 80 is determined on the time axis of the light-emitting device 14 at a resolution of approximately 500 μsec. When the light emission time is shorter than 500 μsec, however, light is possibly emitted at a time point shifted from the intermediate time point of the exposure time. Further, it is conceivable that due to the clock frequency difference between the apparatus, the light emission time point is relatively shifted from the intermediate time point of the exposure time over time.

In the example illustrated in FIG. 12, an intermediate time point $T_L$ of the light emission time 82 comes earlier than an intermediate time point $T_E$ of the exposure time 80. A temporal shift amount d is accordingly obtained to be added to the set light emission time point, so that the intermediate time point $T_L$ of the light emission time is adjusted to the exposure time point $T_E$. To achieve this, the synchronous processing section 140 intentionally shifts the light emission time point, thereby acquiring the transition timing between the state in which the light-emitting markers 6 appear in a captured image and the state in which the light-emitting markers 6 do not appear in the captured image.

In the case of FIG. 12, in a period in which the light emission time 82 of the light-emitting markers 6 is included in the exposure time 80, the images of the light-emitting markers 6 appear in the captured image. When the light emission time 82 gets out of the exposure time 80, the images of the light-emitting markers 6 no longer appear. A light emission time point getting out of the exposure time 80 in a shorter period of time as a result of gradual shifts means that the original light emission time point is biased toward the shift direction in the exposure time. In the example illustrated in FIG. 12, when the light emission time 82 is advanced as indicated by the hollow arrow, the light emission time 82 gets out of the exposure time 80 relatively soon, so that the images do not appear in the captured image. The shift amount d of the original light emission time point $T_L$ is obtained from a time taken for the light emission time to get out of the exposure time, the amount of shift of the light emission time point in each frame, and the exposure time 80.

Figures 13, 14:
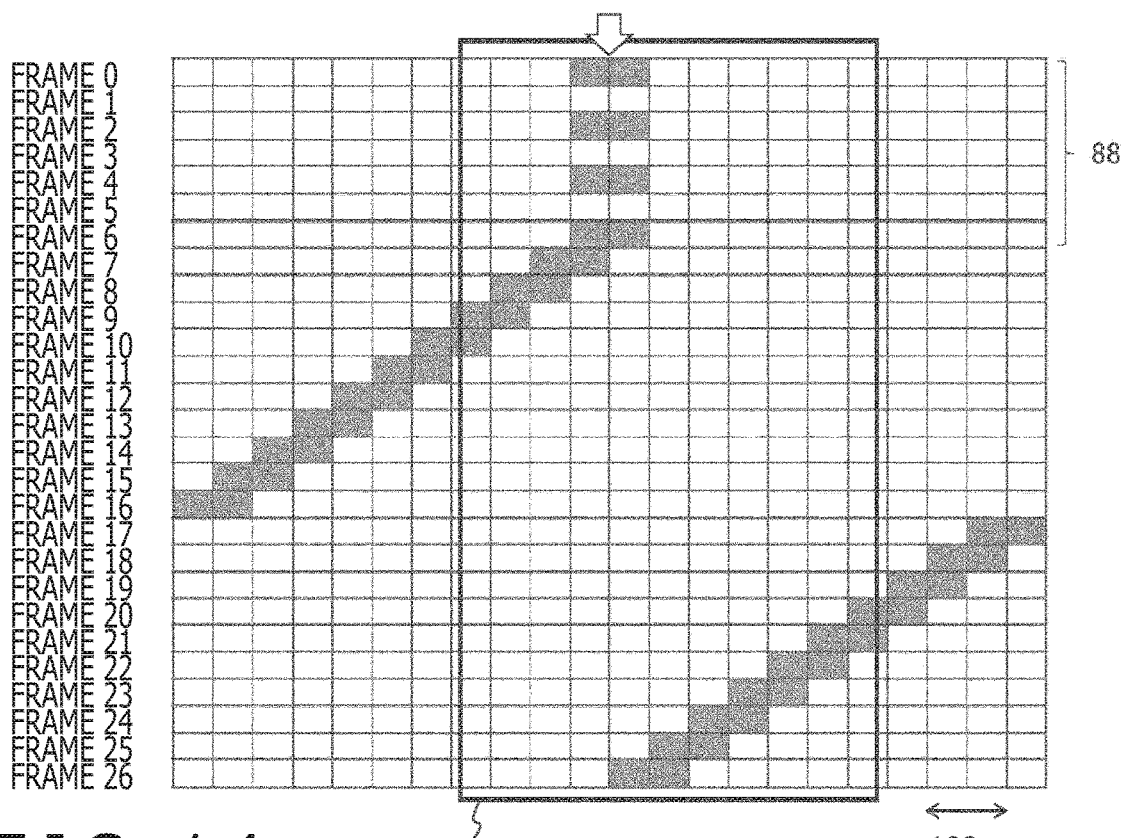
FIG. 13 is a diagram schematically illustrating an exemplary light emission pattern in the background phase of the present embodiment.
FIG. 14 is a diagram illustrating a relation between an original light emission time point and image appearance patterns in the background phase of the present embodiment.

FIG. 13 schematically illustrates an exemplary light emission pattern in the background phase. A manner of representation in FIG. 13 is similar to that in FIG. 10. However, the time width on the horizontal axis is shorter than the time corresponding to one frame and is, for example, approximately 1,100 μsec. In the background phase, as described above, attention is paid to a timing at which the light emission time enters or gets out of the exposure time, and hence it is sufficient that the light emission time point is shifted by a time width approximately twice as long as the exposure time with the center being the set light emission time point indicated by the hollow arrow. Further, the state in which the light emission time is out of the exposure time does not last long so that a drop in accuracy of tracking the position and posture of the light-emitting device 14 is prevented. In the case where the light emission time point comes earlier than the intermediate time point of the exposure time as in FIG. 12, the exposure time is in the range of a rectangle 86, for example.

Further, when the light emission time is set to a short period of time, the shift amount d has a detection error at the corresponding granularity. For example, as illustrated in FIG. 13, when the light emission time is 100 μsec, the detection error is within the range of ±100 μsec. In the example illustrated in FIG. 13, one light emission pattern includes 27 frames ranging from the frame 0 to the frame 26. The light-emitting markers 6 repetitively emit light in the light emission pattern in question in units of 27 frames.

For the same purpose as the broad phase, a sync pattern 88 is provided to the first seven frames (frames 0 to 6). In this example, the sync pattern 88 is a pattern in which the light-emitting markers 6 are alternately on and off. Since the set light emission time point is within the exposure time as a result of adjustment in the broad phase, in the sync pattern 88, light is emitted at the set time point without shifting. Then, the light emission time point is shifted by a predetermined period of time from the frame (frame 7) following the period of the sync pattern 88. In the example illustrated in FIG. 13, the light emission time point is advanced by 50 μsec.

Then, when the amount of shift of the light emission time point reaches a predetermined upper limit time, light is emitted at a time point shifted in the opposite direction by the predetermined upper limit time. In the example illustrated in FIG. 13, the light emission time point is advanced by 500 μsec over the 10 frames (frames 7 to 16), and then, in the next frame (frame 17), light is emitted at a time point delayed by 500 μsec from the original set time point. Thereafter, the light emission time point is shifted by the predetermined period of time in a similar manner. A time point just before the original light emission time point is the end of the light emission pattern for one unit (frames 18 to 26).

When light emission in such a pattern is captured in the exposure time corresponding to the rectangle 86, an image appearance pattern after the sync pattern 88 is {1, 1, 1, 1, 0, 0, 0, 0, 0, 0, 0, 0, 0, 1, 1, 1, 1, 1, 1, 1}. That is, the light emission time gets out of the exposure time in the frame 11 and enters the exposure time again in the frame 20, so that no image appears in the period of the frames 11 to 19. Such an image appearance pattern changes depending on a relation between the exposure time and the original light emission time point.

FIG. 14 illustrates a relation between the original light emission time point and image appearance patterns in the background phase. From the light emission pattern illustrated in FIG. 13, there are 21 image appearance patterns based on a temporal relation between the original light emission time point and the exposure time. However, the variations of image appearance patterns depend on the length of the exposure time or the light emission time, or how much the light emission time point is shifted at a time. When the original light emission time point matches the intermediate time point of the exposure time, the number of frames by which the light emission time gets out of the exposure time and the number of frames by which the light emission time enters the exposure time again to restore the initial state are the same. The pattern of "position 10" corresponds to this case.

The case where the exposure time is in the rectangle 86 in FIG. 13 corresponds to the pattern of "position 13." Thus, the data as illustrated in FIG. 14 is prepared so that a shift of the original light emission time point from the exposure time can be obtained at a granularity of approximately 50 μsec on the basis of the actual image appearance patterns.

Figures 15, 16:
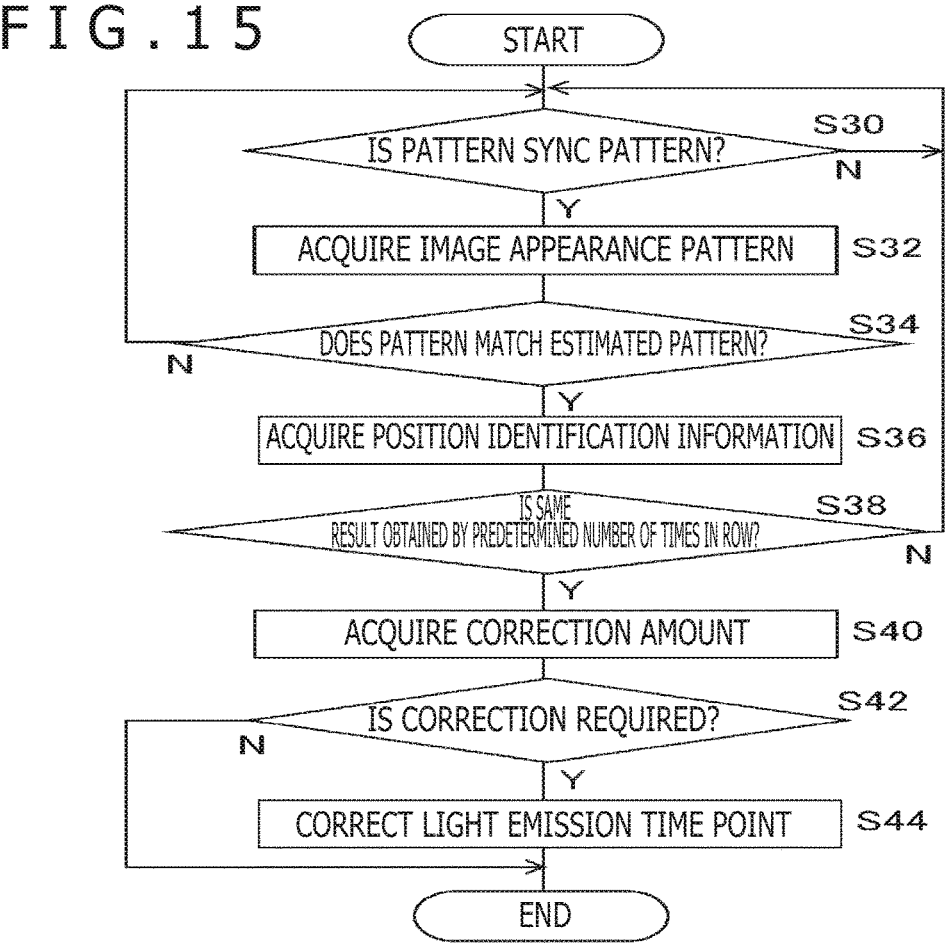
FIG. 15 is a flowchart illustrating a processing procedure by which the synchronous processing section adjusts the light emission time point to an intermediate time point of the exposure time in the background phase of the present embodiment.
FIG. 16 is a diagram exemplifying setting information that is referred to in acquisition of a correction amount from light emission time point identification information in S40 of FIG. 15.

FIG. 15 is a flowchart illustrating a processing procedure by which the synchronous processing section 140 adjusts the light emission time point to the intermediate time point of the exposure time in the background phase. This flowchart starts under a state where the control information transmitting section 142 has requested the light-emitting device 14 to emit light in the light emission pattern for the background phase, and the imaging apparatus 12 is capturing, with short-time exposure, a scene in which the light-emitting markers 6 are repetitively emitting light in the pattern as illustrated in FIG. 13, in response to the request.

Further, the synchronous processing section 140 performs the processing of acquiring data on the captured image to detect the images of the light-emitting markers in parallel. Further, the position and posture acquiring section 134 of the information processing apparatus 10 may acquire the position and posture of the light-emitting device 14 on the basis of the detected images, values measured by the IMU sensor, and the like, and the information processing section 136 may appropriately perform information processing on the basis of the position and the posture. Under this state, the image detection processing is repeated until an image appearance pattern that matches the sync pattern is obtained (N in S30). When the sync pattern is detected (Y in S30), from the next frame, image appearance patterns for identifying a light emission time point corresponding to the exposure time are acquired (S32).

In a case where, when the frames in the light emission pattern for one unit have been captured, the image appearance patterns match none of the estimated patterns as illustrated in FIG. 14, the processing starts again from the sync pattern detection (N in S34). When an image appearance pattern matches one of the estimated patterns (Y in S34), as in "position 13" of FIG. 14, identification information indicating the original light emission time point that is associated with the pattern in question is acquired (S36).

The processing in S30 to S36 is repeated until the same result is obtained a predetermined number of times in a row (N in S38). When the same result is obtained by the predetermined number of times in a row (Y in S38), a correction amount corresponding to the light emission time point is acquired (S40). For example, on the basis of "position 13" obtained in FIG. 14, the temporal shift amount d illustrated in FIG. 12 is acquired as a correction amount. To achieve this, a table or conversion rule in which light emission time point identification information and correction amounts are associated with each other is prepared in advance. In a case where the acquired correction amount indicates that correction is required (Y in S42), the correction amount in question is added to the set original light emission time point so that the light emission time point is corrected (S44).

In a case where correction is not required, no change is made to the set light emission time point (N in S42). The processing procedure illustrated in FIG. 15 is regularly repeated as the background processing of operation processing so that the light emission time point can always be prevented from being shifted from the intermediate time point of the exposure time. FIG. 16 exemplifies setting information that is referred to in the acquisition of a correction amount from light emission time point identification information in S40 of FIG. 15. In a correction amount table 90, the correspondences between light emission time point identification information (light emission time point ID (Identification)) and times to be used for correction (correction amounts) are illustrated. The correction amounts can be derived from the image appearance patterns, the exposure time, the light emission time, and how much the light emission time point is shifted at a time, and are thus calculated in advance.

In the example illustrated in FIG. 14, the 21 different light emission time points are defined. Thus, in the correction amount table 90, correction amounts are set to the 21 pieces of identification information. In the example illustrated in FIG. 16, the correction amounts are illustrated in units of ⅕ of the exposure time (=light emission time). As illustrated in FIG. 13, in the case where the light emission time is shifted by ½ of the light emission time at a time, the correction amounts can be set at a granularity of 0.5 as illustrated in FIG. 16. With correction at this granularity, "position 9" and "position 11," which are adjacent to "position 10" at which the original light emission time point matches the intermediate time point of the exposure time as described above, have a correction amount "0" and do not require correction.

The positions farther from "position 10" have the larger correction amounts, and the maximum correction amount is ±2.5. The set time point is delayed when a positive correction amount is added to the original set time point, and the set time point is advanced when a negative correction amount is added to the original set time point. For example, the example of FIG. 13 corresponds to "position 13," and hence when the set time point is delayed by "shift amount d=0.5×light emission time," the light emission time point almost matches the intermediate time point of the exposure time. When the light emission time is 100 μsec, the light emission time point is delayed by 50 μsec in correction.

It is conceivable that, even with such adjustment, due to a subtle clock frequency difference between the imaging apparatus 12 and the light-emitting device 14, the light emission time point is gradually shifted from the intermediate time point of the exposure time. Meanwhile, the clock frequency difference is obtained by observing the temporal change in such a shift, and hence the shift increase rate can be reduced through the artificial correction of the frequency itself.

Figure 17:
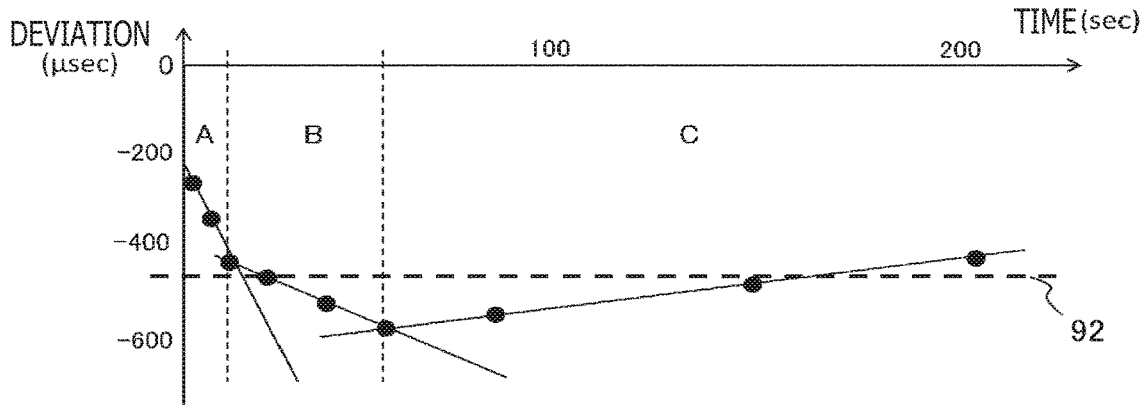
FIG. 17 is a diagram exemplifying a temporal change in a deviation in shift of the light emission time point from the intermediate time point of the exposure time in the present embodiment.

FIG. 17 exemplifies the temporal change in a deviation in shift of the light emission time point from the intermediate time point of the exposure time. Here, a deviation D is a value obtained by the cumulative addition of a correction amount acquired in the i-th processing in S40 in the loop of the flowchart of FIG. 15, that is, a shift amount $d_i$ from the intermediate time point of the exposure time. The deviation D is defined by the following expression.

[Math. 2]

$$D = \Sigma d_i \quad \text{(expression 2)}$$

By the correction described above, the actual shift amount is regularly returned to 0, but the acquired deviation D with the shift amount $d_i$ added thereto monotonously increases or monotonously decreases due to the clock frequency difference. That is, in the case of the time course on the order of seconds as illustrated in FIG. 17, the deviation linearly changes, and the slope thereof indicates the clock frequency difference. Thus, for example, when a deviation slope is obtained in a period A, the clock frequency is corrected in a direction that eliminates the slope. This changes the deviation slope as in a period B.

Then, when a deviation slope is obtained even in the period B, the clock frequency is corrected again to eliminate the slope. Similar processing is performed again also in a next period C to gradually reduce the temporal change in the deviation. In this way, the clock frequency is corrected to achieve an ideal state with no inclination like a deviation 92 indicated by the dotted line. The original clock of the light-emitting device is artificially corrected so that a state in which the intermediate time point of the exposure time and the light emission time point almost match each other can be maintained for a long period of time.

Figure 18:
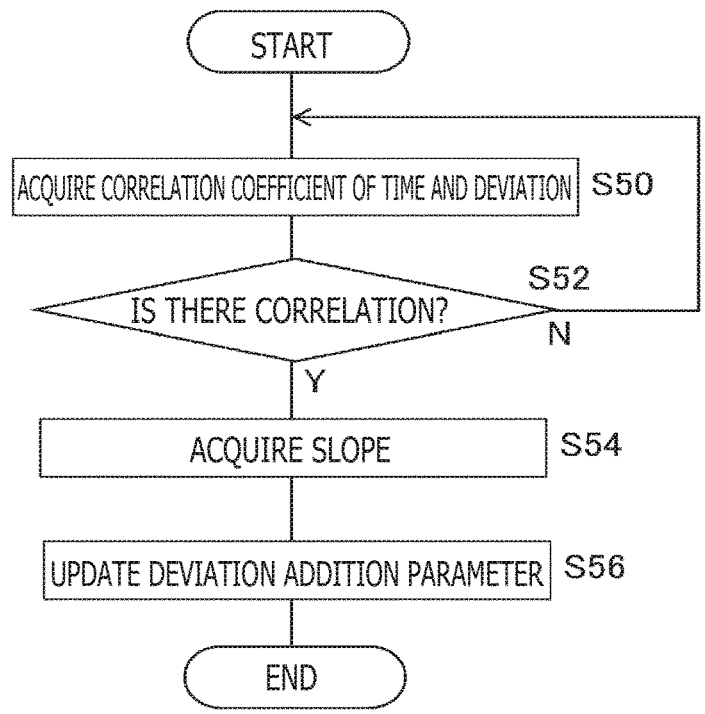
FIG. 18 is a flowchart illustrating a processing procedure by which the synchronous processing section corrects a clock of the light-emitting device in the background phase of the present embodiment.

FIG. 18 is a flowchart illustrating a processing procedure by which the synchronous processing section 140 corrects the clock of the light-emitting device 14 in the background phase. This flowchart is performed in parallel to the light emission time point adjustment processing illustrated in FIG. 15, but may be performed at frequency different from that of the light emission time point adjustment processing. First, as illustrated in FIG. 17, the deviations D are plotted on a time t, and a correlation coefficient r thereof is obtained as follows (S50).

[Math. 3]

$$r = \frac{\Sigma(t - \bar{t})(D - \bar{D})}{\sqrt{\Sigma(t - \bar{t})^2 \Sigma(D - \bar{D})^2}} \quad \text{(expression 3)}$$

Here, t and D with overlines are average values. When a predetermined criterion indicating there is a correlation, such as that the correlation coefficient r has an absolute value larger than 0.99, is not satisfied (N in S52), the plotting of the deviations D and the acquisition of the correlation coefficient r continue (S50). When the predetermined criterion indicating that there is a correlation is satisfied (Y in S52), the slope, which is a slope A, is obtained (S54). This processing is actually the processing of obtaining a slope a in a predetermined period immediately before the period by regression analysis as described below, and adding the slope a to the already obtained slope A.

[Math. 4]

$$a = \frac{\Sigma(t - \bar{t})(D - \bar{D})}{\Sigma(t - \bar{t})^2} \quad \text{(expression 4)}$$

Deviation addition parameters m and n are obtained as described below by using the thus obtained slope A and are transmitted to the light-emitting device 14 as control information so that the set value is updated (S56). Note that, the numerator of the parameter m is for the conversion of the time unit from sec to μsec. Further, the deviation addition parameters m and n are parameters that provide a clock correction amount (correction time) per unit time with $n/m = A \cdot 10^{-6}$.

[Math. 5]

$$m = \frac{10^6}{|A|} \quad \text{(expression 5)}$$
$$n = \frac{A}{|A|}$$

Figure 19:
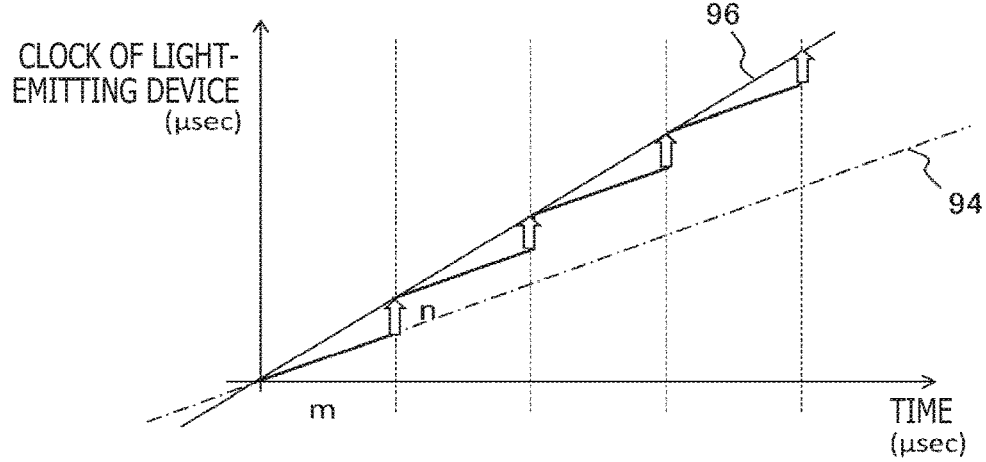
FIG. 19 is a diagram illustrating a method of correcting a clock frequency of the light-emitting device with deviation addition parameters in the present embodiment.

FIG. 19 is a diagram illustrating a method of correcting the clock frequency of the light-emitting device 14 with the deviation addition parameters m and n. The control section 146 of the light-emitting device 14 includes a correction circuit configured to correct the clock frequency from an oscillator. The correction circuit itself may be a general correction circuit. In the graph of FIG. 19, the horizontal axis indicates real time and the vertical axis indicates the clock of the light-emitting device 14. Further, a dashed-dotted line 94 indicates the initial state of the clock.

The control section 146 of the light-emitting device 14 corrects the clock on the basis of the deviation addition parameters m and n transmitted from the information processing apparatus 10 so that n is added to the time every time m. As indicated by a straight line 96 of FIG. 19, when n is positive, the clock is advanced as illustrated in FIG. 19. The clock is delayed when n is negative. With this, the slope changes by $n/m=A\cdot10^{-6}$, so that the change in deviation illustrated in FIG. 17 is theoretically eliminated. However, even such correction includes errors, and hence the deviation addition parameters m and n are obtained regularly and updated to reduce gradually the deviation.

According to the experimentation, with the introduction of the correction processing including the deviation addition, the time taken for the light emission time to get out of the exposure time was significantly extended. The light emission time point is triggered by a timer interrupt in the pec order, but the clock correction illustrated in FIG. 19 allows the light emission time point to be controlled in smaller units.

Figure 20:
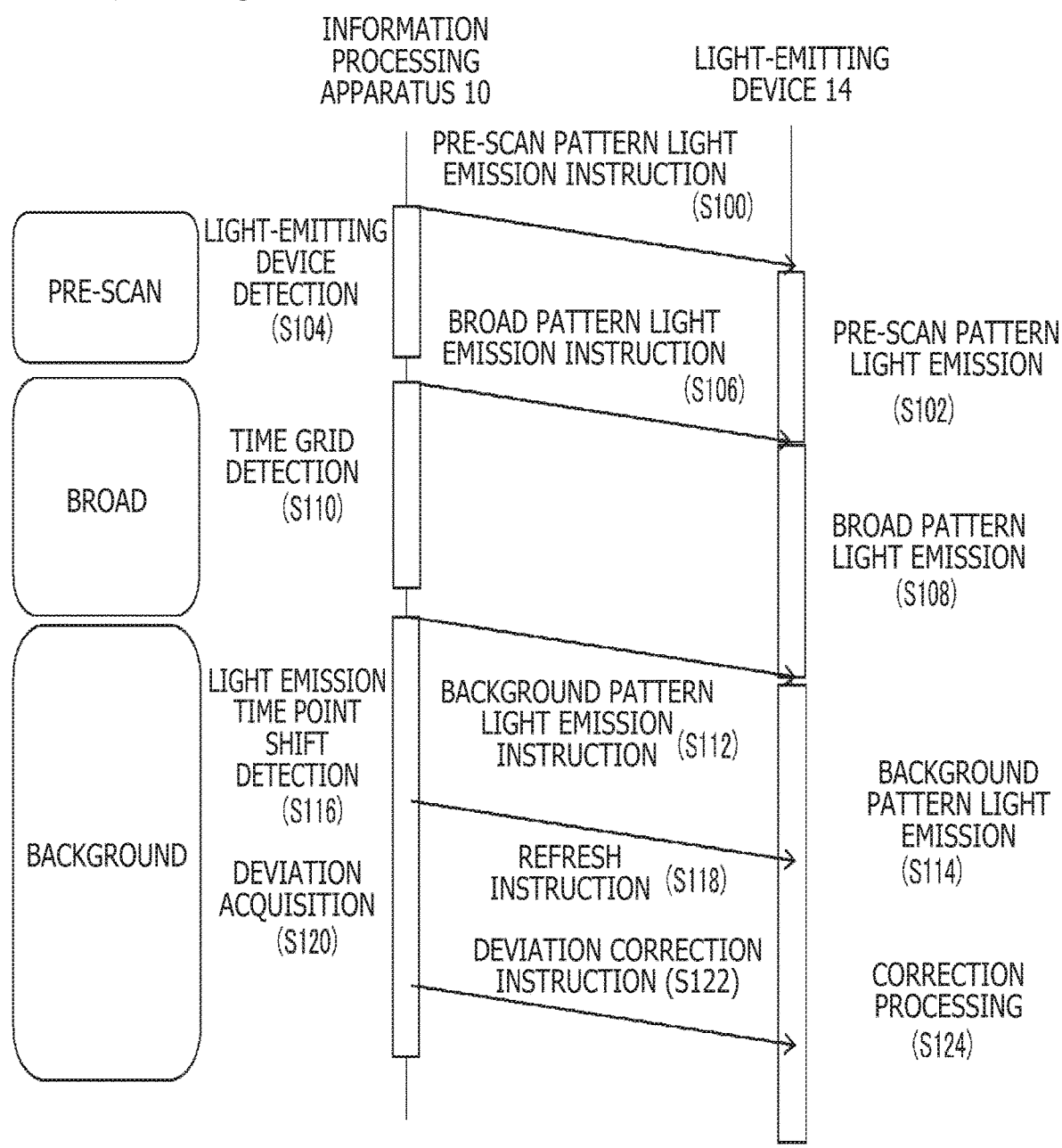
FIG. 20 is a diagram illustrating a sequence of the processing of synchronizing the exposure time and the light emission time point that the information processing apparatus performs in cooperation with the light-emitting device in the present embodiment.

FIG. 20 illustrates the sequence of the processing of synchronizing the exposure time and the light emission time point that the information processing apparatus 10 performs in cooperation with the light-emitting device 14. First, in the pre-scan phase, the information processing apparatus 10 transmits, to the light-emitting device 14, an instruction on light emission in the light emission pattern in the pre-scan phase (S100). In response to this, the light-emitting device 14 causes the light-emitting markers to emit light in the light emission pattern in the pre-scan phase illustrated in FIG. 9, that is, in the whole period (S102). The information processing apparatus 10 detects the light-emitting device 14 by using an image obtained by capturing the scene (S104).

When the light-emitting device can be detected, the processing transitions to the broad phase where the information processing apparatus 10 transmits an instruction on light emission in the light emission pattern in the broad phase (S106). In response to this, the light-emitting device 14 causes the light-emitting markers to emit light in the pattern as illustrated in FIG. 10, that is, causes the light-emitting markers to repetitively flash in a minimum unit being a relatively longer period of time similar to the exposure time (S108). The information processing apparatus 10 detects a time grid corresponding to the exposure time in the clock of the light-emitting device 14 (time axis) by using an image obtained by capturing the scene (S110).

When the time grid in question can be detected, the processing transitions to the background phase where the information processing apparatus 10 transmits an instruction on light emission in the light emission pattern in the background phase (S112). In response to this, the light-emitting device 14 causes the light-emitting markers to emit light in the pattern as illustrated in FIG. 13, that is, causes the light-emitting markers to repetitively emit light for a short period of time suitable for the operation at time points shifted by frames (S114). With the instruction in S112, identification information regarding the time grid corresponding to the exposure time that is detected in the broad phase is specified so that the light emission time point can be set at least within the exposure time in the light-emitting device 14.

The information processing apparatus 10 detects, by using an image obtained by capturing a scene in which the light emission time point is shifted with the basic point being the set time point in question, a shift of the set point from the intermediate time point of the exposure time as described above (S116). Then, the information processing apparatus 10 transmits a refresh instruction for correcting the set time point to the light-emitting device 14 as needed (S118). Further, the information processing apparatus 10 adds the obtained shift amount to acquire the temporal change in the deviation (S120). Then, the information processing apparatus 10 transmits a deviation correction instruction including the deviation addition parameters m and n to the light-emitting device 14 (S122).

The light-emitting device 14 corrects, on the basis of the transmitted refresh instruction and deviation correction instruction, the set light emission time point and the internal clock (S124). With this, a state in which the light emission time point is synchronized with the intermediate time point of the exposure time can be regularly created. As described above, the time taken for the light emission time point to get out of the exposure time is long, so that light emitted by the light-emitting device 14 that had gotten out of the field of view of the imaging apparatus 12 for a few minutes, for example, and has entered the field of view again can positively be captured, with the result that the possibility of losing the sight of the light-emitting device 14 can be significantly reduced.

Note that, since the clock frequencies are unique to the apparatus, when data on the frequency difference, that is, for example, the deviation addition parameters m and n, is acquired once, the data can be used for appropriate clock correction for the imaging apparatus 12 and the light-emitting device 14 corresponding to the obtained data. In this case, the deviation correction processing in the background phase can be omitted.

For example, a table in which the combinations of individual identification information regarding the imaging apparatus 12 and the light-emitting device 14 and deviation addition parameters are associated with each other is prepared in the synchronous processing section 140. Then, deviation addition parameters are read on the basis of individual identification information regarding the imaging apparatus 12 and the light-emitting device 14 that are actually connected to each other so that correction can be made without deriving the parameters in question during operation. The synchronized state can therefore be maintained easily.

According to the present embodiment described above, in the technology for extracting the images of the light-emitting markers from a captured image, to thereby acquire the three-dimensional position and posture of the device including the light-emitting markers, the exposure time of the imaging apparatus and the light emission time of the light-emitting markers are shortened. This can make the images of the light-emitting markers stand out in terms of luminance in the captured image, and thus reduce a possibility that surrounding lighting or strong reflected light is erroneously recognized as the light-emitting markers. Further, the images of the light-emitting markers are prevented from being blurred due to the movements of the device, so that the position-time point correspondence can be clarified. Further, since the light-emitting device can cause the markers to emit light with small power consumption, the light-emitting device can be used as the battery power supply for a long period of time.

Further, results obtained by capturing the markers flashing in a unique light emission pattern are analyzed so that the exposure time of the imaging apparatus and the light emission time of the device, the apparatus and the device operating on the individual time axes, are adjusted to match each other at their central time points. With this, the images can positively be captured with a short light emission time. Further, the light emission time point can be handled as an image-capturing time point, and hence the measurement time points of the IMU sensor incorporated in the device and the image-capturing time point can be identified on the same time axis. As a result, information obtained by the image analysis and information obtained from values measured by the IMU sensor can accurately be integrated, and the accuracy of the finally obtained position and posture can therefore be enhanced.

The adjustment described above includes the phase in which the light-emitting markers are on in the whole period so that the device is detected, the phase in which the light-emitting markers are caused to flash in units of time similar to the exposure time so that the light emission time is included in the exposure time, and the phase in which the intermediate time point of an optimal light emission time is adjusted to the intermediate time point of the exposure time. With the separate phases, the last phase can be performed in parallel to the processing of acquiring the position and posture of the device, so that constant and long-term monitoring and adjustment that do not prevent the information processing, which is the primary processing, can be achieved. Thus, the deviation of the clock unique to the apparatus can be evaluated for a long term, and the accumulation of time shifts can adaptively be eliminated, so that the synchronized state can be maintained for a long period of time with the less often performed correction processing.

The present invention is described above on the basis of the embodiment. The above-mentioned embodiment is exemplary, and it will be understood by those skilled in the art that various modifications can be made to the combinations of the components and the processing processes and that such modifications are also within the scope of the present invention.

For example, in the present embodiment, the light emission in the broad phase has the two states of the on state and the off state, and the image appearance patterns are indicated by the two values, that is, the numerical values of 0 and 1. A plurality of light emission luminance stages may, however, be employed so that the image appearance patterns are indicated by three or more values depending on luminance. To identify a time grid corresponding to an exposure time, the time grids are completely different from each other in numerical sequence indicating an image appearance pattern. Thus, as the number of time grids obtained by division increases, the number of frames required for identifying the time grids increases. With numerical sequences including three or more values, the time grids can be identified with a fewer number of frames, so that the broad phase can be shortened.

INDUSTRIAL APPLICABILITY

As described above, the present invention can be used in information processing apparatuses such as a gaming apparatus, a content processing apparatus, an image analyzing apparatus, and an object recognizing apparatus, input devices, controllers, and systems including them.

REFERENCE SIGNS LIST

6: Light-emitting marker
10: Information processing apparatus
12: Imaging apparatus
14: Light-emitting device
16: Display apparatus
22: CPU
24: GPU
26: Main memory
130: Device data acquiring section
132: Captured image acquiring section
134: Position and posture acquiring section
136: Information processing section
138: Output data generating section
140: Synchronous processing section
142: Control information transmitting section
144: Control information acquiring section
146: Control section
148: Light-emitting section
150: Measurement section
152: Data transmitting section
186: IMU sensor
188: LED

The invention claimed is:

1. An information processing apparatus comprising:
a captured image acquiring section configured to acquire data on a moving image obtained by an imaging apparatus capturing a device including a light-emitting marker with an exposure time shorter than a period of one frame;
a synchronous processing section configured to request the device to cause the light-emitting marker to emit light in a predetermined flashing pattern in a minimum unit being a time obtained by dividing the period of the one frame by a predetermined number and configured to identify the exposure time on a time axis of the device, based on whether or not an image of the light-emitting marker appears in a predetermined number of frames of the moving image obtained by capturing the device;
a control information transmitting section configured to request the device to cause the light-emitting marker to emit light at a light emission time point corresponding to the exposure time;
a position and posture acquiring section configured to acquire position and posture information regarding the device, based on the image in a frame of the moving image of the light-emitting marker emitting light at the light emission time point for a fixed period of time equal to or shorter than the exposure time; and
an output data generating section configured to generate and output data based on the position and posture information.

2. The information processing apparatus according to claim 1, wherein
the synchronous processing section causes the light-emitting marker to emit light in the flashing pattern in a time corresponding to a predetermined number of successive frames to achieve flashing patterns different between time grids obtained by dividing the period by a predetermined number, to thereby identify the time grid corresponding to the exposure time, based on a pattern indicating whether or not the image of the light-emitting marker appears in the predetermined number of frames of the moving image, and the control information transmitting section transmits identification information regarding the time grid identified, thereby requesting the device to cause the light-emitting marker to emit light within the exposure time.

3. The information processing apparatus according to claim 2, wherein the synchronous processing section causes the light-emitting marker to emit light in the flashing pattern in which the time grids adjacent to each other are different from each other only in a time corresponding to one of the predetermined number of frames in terms of a flashing state.

4. The information processing apparatus according to claim 1, wherein the synchronous processing section causes the light-emitting marker to emit light for the fixed period of time while shifting, by the period, the light emission time point by a predetermined period of time with an initial point being a set light emission time point, to thereby identify a shift of the set light emission time point from the exposure time, based on a timing at which the image of the light-emitting marker no longer appears in successive frames of the moving image, and the control information transmitting section transmits a shift amount between the light emission time point and an intermediate time point of the exposure time to the device, thereby causing the device to correct the light emission time point to match the intermediate time point.

5. The information processing apparatus according to claim 4, wherein the synchronous processing section acquires a correction amount of a clock per unit time, based on a temporal change in a deviation of the light emission time point from the exposure time obtained by cumulative addition of the shift amount, and the control information transmitting section transmits the correction amount to the device, thereby causing the device to correct the clock.

6. The information processing apparatus according to claim 1, further comprising:

a device data acquiring section configured to acquire, from the device, a measured value obtained by an inertial measurement unit sensor incorporated in the device, a time point of the measurement, and a time point at which the light-emitting marker is caused to emit light, wherein the position and posture acquiring section uses the time point at which the light-emitting marker is caused to emit light as an image-capturing time point in the frame and integrates the position and posture information obtained from the measured value and the position and posture information based on the image in the frame, based on a relation between the measurement time point and the image-capturing time point.

7. The information processing apparatus according to claim 1, wherein the synchronous processing section causes the light-emitting marker to emit light in a flashing pattern in a minimum unit being a first time shorter than the period, to thereby acquire a range of the light emission time point included in the exposure time, and achieves a first state in which the light-emitting marker is caused to emit light in the range, and the synchronous processing section then causes the light-emitting marker to emit light in a flashing pattern in a minimum unit being a second time shorter than the first time, to thereby detect and correct a shift of the light emission time point in the first state from an intermediate time point of the exposure time, and achieves a second state in which the intermediate time point matches the light emission time point.

8. The information processing apparatus according to claim 7, wherein the synchronous processing section uses the second time as the fixed period of time, and the position and posture acquiring section acquires the position and posture information regarding the device, based on the image, in parallel to processing of the synchronous processing section for achieving the second state.

9. The information processing apparatus according to claim 7, wherein the synchronous processing section acquires and corrects, in parallel to processing for achieving the second state, a clock frequency difference between the imaging apparatus and the device, based on a temporal change in a deviation of the light emission time point from the exposure time obtained by cumulative addition of the shift amount.

10. The information processing apparatus according to claim 7, wherein the synchronous processing section causes, before causing the light-emitting marker to emit light in the flashing pattern in the minimum unit being the first time, the light-emitting marker to emit light in a whole period, to thereby detect the device based on the image of the light-emitting marker that appears in the frame.

11. The information processing apparatus according to claim 1, wherein the synchronous processing section identifies the light emission time point corresponding to the exposure time, based on a numerical sequence of an image appearance pattern that indicates, with 1 and 0, whether or not the image of the light-emitting marker appears in each of the frames.

12. The information processing apparatus according to claim 1, wherein the synchronous processing section causes the light-emitting marker to repetitively emit light in the flashing pattern with, as a unit, a time corresponding to a predetermined number of successive frames of the moving image, and sets, to a part of the time corresponding to the unit, a flashing pattern for detecting an end of the time corresponding to the unit.

13. An information processing system comprising:
a device including a light-emitting marker;
an imaging apparatus configured to capture the device with an exposure time shorter than a period of one frame; and
an information processing apparatus configured to acquire position and posture information regarding the device by using data on a moving image captured by the imaging apparatus,
the information processing apparatus including
a synchronous processing section configured to request the device to cause the light-emitting marker to emit light in a predetermined flashing pattern in a minimum unit being a time obtained by dividing the period of the one frame by a predetermined number and configured to identify the exposure time on a time axis of the device, based on whether or not an image of the light-emitting marker appears in a predetermined number of frames of the moving image obtained by capturing the device, a control information transmitting section configured to request the device to cause the light-emitting marker to emit light at a light emission time point corresponding to the exposure time, a position and posture acquiring section configured to acquire the position and posture information regarding the device based on the image in a frame of the moving image of the light-emitting marker emitting light at the light emission time point for a fixed period of time equal to or shorter than the exposure time, and an output data generating section configured to generate and output data based on the position and posture information.

14. A device for position and posture acquisition, the device being captured by an imaging apparatus with an exposure time shorter than a period of one frame, and position and posture information regarding the device being acquired by an information processing apparatus using a captured moving image, the device comprising:

a light-emitting marker;

a control information acquiring section configured to acquire requests associated with light emission from the information processing apparatus; and a control section configured to cause, in response to a first one of the requests, the light-emitting marker to repetitively emit light in a predetermined flashing pattern in a minimum unit being a time obtained by dividing the period of the one frame by a predetermined number, and cause, in response to a second one of the requests, the light-emitting marker to emit light at a light emission time point corresponding to the exposure time indicated on a time axis of the device for a fixed period of time equal to or shorter than the exposure time.

15. The device for position and posture acquisition according to claim 14, further comprising:

an inertial measurement unit sensor configured to measure a movement of the device; and a data transmitting section configured to transmit, to the information processing apparatus, a value measured by the inertial measurement unit sensor, a time point of the measurement, and a time point at which the light-emitting marker is caused to emit light.

16. A device information acquisition method for an information processing apparatus, comprising:

acquiring data on a moving image obtained by an imaging apparatus capturing a device including a light-emitting marker with an exposure time shorter than a period of one frame;

requesting the device to cause the light-emitting marker to emit light in a predetermined flashing pattern in a minimum unit being a time obtained by dividing the period of the one frame by a predetermined number;

identifying the exposure time on a time axis of the device, based on whether or not an image of the light-emitting marker appears in a predetermined number of frames of the moving image obtained by capturing the device;

requesting the device to cause the light-emitting marker to emit light at a light emission time point corresponding to the exposure time;

acquiring position and posture information regarding the device based on the image in a frame of the moving image of the light-emitting marker emitting light at the light emission time point for a fixed period of time equal to or shorter than the exposure time; and generating and outputting data based on the position and posture information.

17. A non-transitory, computer readable storage medium containing a computer program, which when executed by a computer, causes the computer to implement a device information acquisition method by carrying out actions, comprising:

acquiring data on a moving image obtained by an imaging apparatus capturing a device including a light-emitting marker with an exposure time shorter than a period of one frame;

requesting the device to cause the light-emitting marker to emit light in a predetermined flashing pattern in a minimum unit being a time obtained by dividing the period of the one frame by a predetermined number;

identifying the exposure time on a time axis of the device, based on whether or not an image of the light-emitting marker appears in a predetermined number of frames of the moving image obtained by capturing the device;

requesting the device to cause the light-emitting marker to emit light at a light emission time point corresponding to the exposure time;

acquiring position and posture information regarding the device based on the image in a frame of the moving image of the light-emitting marker emitting light at the light emission time point for a fixed period of time equal to or shorter than the exposure time; and generating and outputting data based on the position and posture information.

* * * * *